United States Patent
Lo et al.

(10) Patent No.: US 10,904,070 B2
(45) Date of Patent: Jan. 26, 2021

(54) TECHNIQUES AND INTERFACES FOR TROUBLESHOOTING DATACENTER NETWORKS

(71) Applicant: Cisco Technology, Inc., San Jose, CA (US)

(72) Inventors: Chien-Ju Lo, Fremont, CA (US); Bill YuFan Chen, Los Gatos, CA (US); Kannan Ponnuswamy, Murphy, TX (US); Kollivakkam Raghavan, San Jose, CA (US); Navneet Yadav, Cupertino, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 57 days.

(21) Appl. No.: 16/032,428

(22) Filed: Jul. 11, 2018

(65) Prior Publication Data
US 2020/0021482 A1   Jan. 16, 2020

(51) Int. Cl.
*H04L 12/24* (2006.01)
*H04L 12/26* (2006.01)

(52) U.S. Cl.
CPC ...... *H04L 41/0631* (2013.01); *H04L 41/0609* (2013.01); *H04L 41/0672* (2013.01);
(Continued)

(58) Field of Classification Search
CPC . H04L 41/0609; H04L 41/0672; H04L 41/22; H04L 41/5074; H04L 43/067; H04L 43/08; H04L 41/0253
See application file for complete search history.

(56) References Cited

U.S. PATENT DOCUMENTS

| | | |
|---|---|---|
| 5,204,829 A | 4/1993 | Lyu et al. |
| 6,763,380 B1 | 7/2004 | Mayton et al. |

(Continued)

FOREIGN PATENT DOCUMENTS

| | | |
|---|---|---|
| CN | 105471830 | 4/2016 |
| CN | 105721193 | 6/2016 |

(Continued)

OTHER PUBLICATIONS

Cisco Systems, Inc., "The Cisco Application Policy Infrastructure Controller Introduction: What is the Cisco Application Policy Infrastructure Controller?" Jul. 31, 2014, 19 pages.
(Continued)

*Primary Examiner* — Ario Etienne
*Assistant Examiner* — Kidest Mendaye
(74) *Attorney, Agent, or Firm* — Polsinelli PC

(57) ABSTRACT

A monitoring device for troubleshooting events in a datacenter network identifies a first network event for a time period, and provides an initial display page, one or more additional display pages, selectable display objects, and a representation of the first network event. The device generates a dynamic troubleshooting path for the first network event to track a user navigation between display pages, a manipulation of the one or more selectable display objects, and a last-current display page, and also provides an indication of a second network event associated with higher resolution priority relative to the first network event. Retrieving the dynamic troubleshooting path causes the interface to present the last-current display page, apply the manipulation of the one or more selectable display objects, and load the user navigation between the initial dashboard display page and the one or more additional display pages in a cache.

20 Claims, 11 Drawing Sheets

(52) U.S. Cl.
CPC .......... *H04L 41/22* (2013.01); *H04L 41/5074* (2013.01); *H04L 43/067* (2013.01); *H04L 43/08* (2013.01)

(56) References Cited

U.S. PATENT DOCUMENTS

| | | |
|---|---|---|
| 7,003,562 B2 | 2/2006 | Mayer |
| 7,089,369 B2 | 8/2006 | Emberling |
| 7,127,686 B2 | 10/2006 | Drechsler et al. |
| 7,360,064 B1 | 4/2008 | Steiss et al. |
| 7,453,886 B1 | 11/2008 | Allan |
| 7,505,463 B2 | 3/2009 | Schuba et al. |
| 7,548,967 B2 | 6/2009 | Amyot et al. |
| 7,552,201 B2 | 6/2009 | Areddu et al. |
| 7,609,647 B2 | 10/2009 | Turk et al. |
| 7,619,989 B2 | 11/2009 | Guingo et al. |
| 7,698,561 B2 | 4/2010 | Nagendra et al. |
| 7,743,274 B2 | 6/2010 | Langford et al. |
| 7,765,093 B2 | 7/2010 | Li et al. |
| 8,010,952 B2 | 8/2011 | Datla et al. |
| 8,073,935 B2 | 12/2011 | Viswanath |
| 8,103,480 B2 | 1/2012 | Korn et al. |
| 8,190,719 B2 | 5/2012 | Furukawa |
| 8,209,738 B2 | 6/2012 | Nicol et al. |
| 8,261,339 B2 | 9/2012 | Aldridge et al. |
| 8,312,261 B2 | 11/2012 | Rao et al. |
| 8,375,117 B2 | 2/2013 | Venable, Sr. |
| 8,441,941 B2 | 5/2013 | McDade et al. |
| 8,479,267 B2 | 7/2013 | Donley et al. |
| 8,484,693 B2 | 7/2013 | Cox et al. |
| 8,494,977 B1 | 7/2013 | Yehuda et al. |
| 8,554,883 B2 | 8/2013 | Sankaran |
| 8,588,078 B1* | 11/2013 | Fugate ............... H04L 41/5074 370/241 |
| 8,589,934 B2 | 11/2013 | Makljenovic et al. |
| 8,621,284 B2 | 12/2013 | Kato |
| 8,627,328 B2 | 1/2014 | Mousseau et al. |
| 8,693,344 B1 | 4/2014 | Adams et al. |
| 8,693,374 B1 | 4/2014 | Murphy et al. |
| 8,761,036 B2 | 6/2014 | Fulton et al. |
| 8,782,182 B2 | 7/2014 | Chaturvedi et al. |
| 8,824,482 B2 | 9/2014 | Kajekar et al. |
| 8,910,143 B2 | 12/2014 | Cohen et al. |
| 8,914,843 B2 | 12/2014 | Bryan et al. |
| 8,924,798 B2 | 12/2014 | Jerde et al. |
| 9,019,840 B2 | 4/2015 | Salam et al. |
| 9,038,151 B1 | 5/2015 | Chua et al. |
| 9,055,000 B1 | 6/2015 | Ghosh et al. |
| 9,106,555 B2 | 8/2015 | Agarwal et al. |
| 9,137,096 B1 | 9/2015 | Yehuda et al. |
| 9,225,601 B2 | 12/2015 | Khurshid et al. |
| 9,246,818 B2 | 1/2016 | Deshpande et al. |
| 9,264,922 B2 | 2/2016 | Gillot et al. |
| 9,276,877 B1 | 3/2016 | Chua et al. |
| 9,319,300 B2 | 4/2016 | Huynh Van et al. |
| 9,344,348 B2 | 5/2016 | Ivanov et al. |
| 9,369,434 B2 | 6/2016 | Kim et al. |
| 9,389,993 B1 | 7/2016 | Okmyanskiy et al. |
| 9,405,553 B2 | 8/2016 | Branson et al. |
| 9,444,842 B2 | 9/2016 | Porras et al. |
| 9,497,207 B2 | 11/2016 | Dhawan et al. |
| 9,497,215 B2 | 11/2016 | Vasseur et al. |
| 9,544,224 B2 | 1/2017 | Chu et al. |
| 9,548,965 B2 | 1/2017 | Wang et al. |
| 9,553,845 B1 | 1/2017 | Talmor et al. |
| 9,571,502 B2 | 2/2017 | Basso et al. |
| 9,571,523 B2 | 2/2017 | Porras et al. |
| 9,594,640 B1 | 3/2017 | Chheda |
| 9,596,141 B2 | 3/2017 | McDowall |
| 9,641,249 B2 | 5/2017 | Kaneriya et al. |
| 9,654,300 B2 | 5/2017 | Pani |
| 9,654,361 B2 | 5/2017 | Vasseur et al. |
| 9,654,409 B2 | 5/2017 | Yadav et al. |
| 9,660,886 B1 | 5/2017 | Ye et al. |
| 9,660,897 B1 | 5/2017 | Gredler |
| 9,667,645 B1 | 5/2017 | Belani et al. |
| 9,680,875 B2 | 6/2017 | Knjazihhin et al. |
| 9,686,180 B2 | 6/2017 | Chu et al. |
| 9,686,296 B1 | 6/2017 | Murchison et al. |
| 9,690,644 B2 | 6/2017 | Anderson et al. |
| 9,781,004 B2 | 10/2017 | Danait et al. |
| 9,787,559 B1 | 10/2017 | Schroeder |
| 9,998,247 B1 | 6/2018 | Choudhury et al. |
| 10,084,795 B2 | 9/2018 | Akireddy et al. |
| 10,084,833 B2 | 9/2018 | McDonnell et al. |
| 10,084,895 B2 | 9/2018 | Kasat et al. |
| 10,263,836 B2* | 4/2019 | Jain ..................... H04L 41/0672 |
| 2002/0143855 A1 | 10/2002 | Traversat et al. |
| 2002/0178246 A1 | 11/2002 | Mayer |
| 2003/0229693 A1 | 12/2003 | Mahlik et al. |
| 2004/0073647 A1 | 4/2004 | Gentile et al. |
| 2004/0168100 A1 | 8/2004 | Thottan et al. |
| 2005/0108389 A1 | 5/2005 | Kempin et al. |
| 2007/0011629 A1 | 1/2007 | Shacham et al. |
| 2007/0124437 A1 | 5/2007 | Chervets |
| 2007/0214244 A1 | 9/2007 | Hitokoto et al. |
| 2008/0031147 A1 | 2/2008 | Fieremans et al. |
| 2008/0117827 A1 | 5/2008 | Matsumoto et al. |
| 2008/0133731 A1 | 6/2008 | Bradley et al. |
| 2008/0168531 A1* | 7/2008 | Gavin ................. H04L 63/1408 726/1 |
| 2008/0172716 A1 | 7/2008 | Talpade et al. |
| 2009/0240758 A1 | 9/2009 | Pasko et al. |
| 2009/0249284 A1 | 10/2009 | Antosz et al. |
| 2010/0191612 A1 | 7/2010 | Raleigh |
| 2010/0198909 A1 | 8/2010 | Kosbab et al. |
| 2011/0093612 A1 | 4/2011 | Murakami |
| 2011/0295983 A1 | 12/2011 | Medved et al. |
| 2012/0054163 A1 | 3/2012 | Liu et al. |
| 2012/0198073 A1 | 8/2012 | Srikanth et al. |
| 2012/0297061 A1 | 11/2012 | Pedigo et al. |
| 2012/0311429 A1* | 12/2012 | Decker ............... G06F 16/9574 715/234 |
| 2013/0097660 A1 | 4/2013 | Das et al. |
| 2013/0191516 A1 | 7/2013 | Sears |
| 2014/0019597 A1 | 1/2014 | Nath et al. |
| 2014/0052645 A1* | 2/2014 | Hawes ................. G06Q 30/016 705/304 |
| 2014/0177638 A1 | 6/2014 | Bragg et al. |
| 2014/0222996 A1 | 8/2014 | Vasseur et al. |
| 2014/0304831 A1 | 10/2014 | Hidlreth et al. |
| 2014/0307556 A1 | 10/2014 | Zhang |
| 2014/0321277 A1 | 10/2014 | Lynn, Jr. et al. |
| 2014/0379915 A1 | 12/2014 | Yang et al. |
| 2015/0019756 A1 | 1/2015 | Masuda |
| 2015/0113143 A1 | 4/2015 | Stuart et al. |
| 2015/0124826 A1 | 5/2015 | Edsall et al. |
| 2015/0186206 A1 | 7/2015 | Bhattacharya et al. |
| 2015/0234695 A1 | 8/2015 | Cuthbert et al. |
| 2015/0244617 A1 | 8/2015 | Nakil et al. |
| 2015/0271104 A1 | 9/2015 | Chikkamath et al. |
| 2015/0295771 A1 | 10/2015 | Cuni et al. |
| 2015/0312125 A1* | 10/2015 | Subramanian ...... H04L 43/0876 709/224 |
| 2015/0365314 A1 | 12/2015 | Hiscock et al. |
| 2015/0381484 A1 | 12/2015 | Hira et al. |
| 2016/0020993 A1 | 1/2016 | Wu et al. |
| 2016/0021141 A1 | 1/2016 | Liu et al. |
| 2016/0026631 A1 | 1/2016 | Salam et al. |
| 2016/0036636 A1 | 2/2016 | Erickson et al. |
| 2016/0048420 A1 | 2/2016 | Gourlay et al. |
| 2016/0078220 A1 | 3/2016 | Scharf et al. |
| 2016/0080350 A1 | 3/2016 | Chaturvedi et al. |
| 2016/0099883 A1* | 4/2016 | Voit .................... H04L 41/0873 709/226 |
| 2016/0105317 A1 | 4/2016 | Zimmermann et al. |
| 2016/0112246 A1 | 4/2016 | Singh et al. |
| 2016/0112269 A1 | 4/2016 | Singh et al. |
| 2016/0149751 A1 | 5/2016 | Pani et al. |
| 2016/0164748 A1* | 6/2016 | Kim ..................... G06N 5/046 706/47 |
| 2016/0210207 A1* | 7/2016 | Chavez ................ G06F 40/103 |
| 2016/0224277 A1 | 8/2016 | Batra et al. |
| 2016/0241436 A1 | 8/2016 | Fourie et al. |

(56) References Cited

U.S. PATENT DOCUMENTS

| | | |
|---|---|---|
| 2016/0254964 A1 | 9/2016 | Benc |
| 2016/0267384 A1 | 9/2016 | Salam et al. |
| 2016/0323319 A1 | 11/2016 | Gourlay et al. |
| 2016/0330076 A1 | 11/2016 | Tiwari et al. |
| 2016/0352566 A1 | 12/2016 | Mekkattuparamnban et al. |
| 2016/0380892 A1 | 12/2016 | Mahadevan et al. |
| 2017/0012840 A1* | 1/2017 | Zaidi ............... G06Q 20/389 |
| 2017/0026292 A1 | 1/2017 | Smith et al. |
| 2017/0031800 A1 | 2/2017 | Shani et al. |
| 2017/0031970 A1 | 2/2017 | Burk |
| 2017/0048110 A1 | 2/2017 | Wu et al. |
| 2017/0048126 A1 | 2/2017 | Handige Shankar et al. |
| 2017/0054758 A1 | 2/2017 | Maino et al. |
| 2017/0063599 A1 | 3/2017 | Wu et al. |
| 2017/0093630 A1 | 3/2017 | Foulkes |
| 2017/0093664 A1 | 3/2017 | Lynam et al. |
| 2017/0093750 A1 | 3/2017 | McBride et al. |
| 2017/0093918 A1 | 3/2017 | Banerjee et al. |
| 2017/0111236 A1* | 4/2017 | Bielenberg ............ H04L 41/22 |
| 2017/0111259 A1 | 4/2017 | Wen et al. |
| 2017/0118167 A1 | 4/2017 | Subramanya et al. |
| 2017/0126740 A1 | 5/2017 | Bejarano Ardila et al. |
| 2017/0126792 A1 | 5/2017 | Halpern et al. |
| 2017/0134233 A1 | 5/2017 | Dong et al. |
| 2017/0163442 A1 | 6/2017 | Shen et al. |
| 2017/0168959 A1* | 6/2017 | Dodonov ............ G06F 16/9574 |
| 2017/0187577 A1 | 6/2017 | Nevrekar et al. |
| 2017/0195187 A1 | 7/2017 | Bennett et al. |
| 2017/0206129 A1 | 7/2017 | Yankilevich et al. |
| 2017/0222873 A1 | 8/2017 | Lee et al. |
| 2017/0277625 A1* | 9/2017 | Shtuchkin ........... G06F 11/3688 |
| 2017/0288966 A1* | 10/2017 | Chakra .............. H04L 41/0883 |
| 2017/0353355 A1 | 12/2017 | Danait et al. |
| 2018/0069754 A1 | 3/2018 | Dasu et al. |
| 2018/0107632 A1* | 4/2018 | Blinn ................. G06F 16/9577 |
| 2018/0167294 A1 | 6/2018 | Gupta et al. |
| 2018/0295013 A1* | 10/2018 | Deb ........................ H04L 41/16 |

FOREIGN PATENT DOCUMENTS

| | | |
|---|---|---|
| CN | 105721297 | 6/2016 |
| CN | 106130766 | 11/2016 |
| CN | 106603264 | 4/2017 |
| CN | 103701926 | 6/2017 |
| WO | WO 2015/014177 | 2/2015 |
| WO | WO 2015/187337 | 12/2015 |
| WO | WO 2016/011888 | 1/2016 |
| WO | WO 2016/039730 | 3/2016 |
| WO | WO 2016/072996 | 5/2016 |
| WO | WO 2016/085516 | 6/2016 |
| WO | WO 2016/093861 | 6/2016 |
| WO | WO 2016/119436 | 8/2016 |
| WO | WO 2016/130108 | 8/2016 |
| WO | WO 2016/161127 | 10/2016 |
| WO | WO 2017/031922 | 3/2017 |
| WO | WO 2017/039606 | 3/2017 |
| WO | WO 2017/105452 | 6/2017 |

OTHER PUBLICATIONS

Jain, Praveen, et al., "In-Line Distributed and Stateful Security Policies for Applications in a Network Environment," Cisco Systems, Inc., Aug. 16, 2016, 13 pages.

Maldonado-Lopez, Ferney, et al., "Detection and prevention of firewall—rule conflicts on software-defined networking," 2015 7th International Workshop on Reliable Networks Design and Modeling (RNDM), IEEE, Oct. 5, 2015, pp. 259-265.

Vega, Andres, et al., "Troubleshooting Cisco Application Centric Infrastructure: Analytical problem solving applied to the Policy Driven Data Center," Feb. 15, 2016, 84 pages.

Xia, Wenfeng, et al., "A Survey on Software-Defined Networking," IEEE Communications Surveys and Tutorials, Mar. 16, 2015, pp. 27-51.

Akella, Aditya, et al., "A Highly Available Software Defined Fabric," HotNets-XIII, Oct. 27-28, 2014, Los Angeles, CA, USA, Copyright 2014, ACM, pp. 1-7.

Alsheikh, Mohammad Abu, et al., "Machine Learning in Wireless Sensor Networks: Algorithms, Strategies, and Application," Mar. 19, 2015, pp. 1-23.

Author Unknown, "Aids to Pro-active Management of Distributed Resources through Dynamic Fault-Localization and Availability Prognosis," FaultLocalization-TR01-CADlab, May 2006, pp. 1-9.

Author Unknown, "Requirements for applying formal methods to software-defined networking," Telecommunication Standardization Sector of ITU, Series Y: Global Information Infrastructure, Internet Protocol Aspects and Next-Generation Networks, Apr. 8, 2015, pp. 1-20.

Cisco Systems, Inc., "Cisco Application Centric Infrastructure 9ACI Endpoint Groups (EPG) Usange and Design," White Paper, May 2014, pp. 1-14.

Cisco, "Verify Contracts and Rules in the ACI Fabric," Cisco, Updated Aug. 19, 2016, Document ID: 119023, pp. 1-20.

De Silva et al., "Network-wide Security Analysis," Semantic Scholar, Oct. 25, 2011, pp. 1-11.

Dhawan, Mohan, et al., "SPHINX: Detecting Security Attacks in Software-Defined Networks," NDSS 2015, Feb. 8-11, 2015, San Diego, CA, USA, Copyright 2015 Internet Society, pp. 1-15.

Fayaz, Seyed K., et al., "Efficient Network Reachability Analysis using a Succinct Control Plane Representation," 2016, ratul.org, pp. 1-16.

Feldmann, Anja, et al., "IP Network Configuration for Intradomain Traffic Engineering," Semantic Scholar, accessed on Jul. 20, 2017, pp. 1-27.

Han, Wonkyu, et al., "LPM: Layered Policy Management for Software-Defined Networks," Mar. 8, 2016, pp. 1-8.

Han, Yoonseon, et al., "An Intent-based Network Virtualization Platform for SDN," 2016 I FIP, pp. 1-6.

Kazemian, Peyman, et al., "Real Time Network Policy Checking using Header Space Analysis," USENIX Association, 10th USENIX Symposium on Networked Systems Design and Implementation (NSDI '13) pp. 99-111.

Khatkar, Pankaj Kumar, "Firewall Rule Set Analysis and Visualization, A Thesis Presented in Partial Fulfillment of the Requirements for the Degree Master of Science," Arizona State University, Dec. 2014, pp. 1-58.

Le, Franck, et al., "Minerals: Using Data Mining to Detect Router Misconfigurations," CyLab, Carnegie Mellon University, CMU-CyLab-06-008, May 23, 2006, pp. 1-14.

Liang, Chieh-Jan Mike, et al., "SIFT: Building an Internet of Safe Things," Microsoft, IPSN' 15, Apr. 14-16, 2015, Seattle, WA, ACM 978, pp. 1-12.

Lindem, A., et al., "Network Device YANG Organizational Model draft-rtgyangdt-rtgwg-device-model-01," Network Working Group, Internet-draft, Sep. 21, 2015, pp. 1-33.

Liu, Jason, et al., "A Real-Time Network Simulation Infrastructure Based on Open VPN," Journal of Systems and Software, Aug. 4, 2008, pp. 1-45.

Lopes, Nuno P., et al., "Automatically verifying reachability and well-formedness in P4 Networks," Microsoft, accessed on Jul. 18, 2017, pp. 1-13.

Mai, Haohui, et al., "Debugging the Data Plane with Anteater," SIGCOMM11, Aug. 15-19, 2011, pp. 1-12.

Miller, Nancy, et al., "Collecting Network Status Information for Network-Aware Applications," INFOCOM 2000, pp. 1-10.

Miranda, Joao Sales Henriques, "Fault Isolation in Software Defined Networks," www.gsd.inescid.pt, pp. 1-10.

Moon, Daekyeong, et al., "Bridging the Software/Hardware Forwarding Divide," Berkeley.edu, Dec. 18, 2010, pp. 1-15.

Panda, Aurojit, et al., "SCL: Simplifying Distributed SDN Control Planes," people.eecs.berkeley.edu, Mar. 2017, pp. 1-17.

Shin, Seugwon, et al., "FRESCO: Modular Composable Security Services for Software-Defined Networks," To appear in the ISOC Network and Distributed System Security Symposium, Feb. 2013, pp. 1-16.

Shukla, Apoorv, et al., "Towards meticulous data plane monitoring," kaust.edu.sa, access on Aug. 1, 2017, pp. 1-2.

(56) References Cited

OTHER PUBLICATIONS

Tang, Yongning, et al., "Automatic belief network modeling via policy inference for SDN fault localization," Journal of Internet Services and Applications, 2016, pp. 1-13.

Tomar, Kuldeep, et al., "Enhancing Network Security And Performance Using Optimized ACLs," International Journal in Foundations of Computer Science & Technology (IJFCST), vol. 4, No. 6, Nov. 2014, pp. 25-35.

Tongaonkar, Alok, et al., "Inferring Higher Level Policies from Firewall Rules," Proceedings of the 21st Large Installation System Administration Conference (LISA '07), Nov. 11-16, 2007, pp. 1-14.

Yu et al., "A Flexible Framework for Wireless-Based Intelligent Sensor with Reconfigurability, Dynamic adding, and Web interface," Conference Paper, Jul. 24, 2006, IEEE 2006, pp. 1-7.

Zhou, Shijie, et al., "High-Performance Packet Classification on GPU," 2014 IEEE, pp. 1-6.

\* cited by examiner

TECHNIQUES AND INTERFACES FOR TROUBLESHOOTING DATACENTER NETWORKS

TECHNICAL FIELD

The present subject matter relates generally to communication networks, and more particularly, to improved interfaces for troubleshooting and resolving network issues/events.

BACKGROUND

Consumers and businesses alike are increasingly transitioning from local computing environments (e.g., on-site computers, storage, etc.) to network-based services. Network-based services offer access to customizable, scalable, and powerful computing resources over a network (e.g., the Internet). Typically, the underlying hardware and software that support these network-based services are housed in large-scale data centers, which can include hundreds or even thousands of network devices (e.g., servers, switches, processors, memory, load balancers, virtual machines (VMs), firewalls, etc.). Service providers provision, manage, and/or otherwise configure the hardware/software in these data centers in accordance with service level agreements (SLAs), customer policies, security requirements, and so on. While service providers often offer a variety customizable and scalable configuration, the sheer number of devices as well as the dynamic nature of changing customer needs often results in complex networks of interconnected devices within each data center.

In an effort to competitively meet customer needs, some services providers employ software-defined network (SDN) models as well as intent-based frameworks—which serve as abstractions of lower-level network functions—to help automate data center resource management, control, and policy enforcement. While many of these automated approaches largely eliminate the laborious task of manually configuring (and re-configuring) network devices, such automation generates a large amount of data related to network status, health, configuration parameters, errors, and so on. In turn, this large amount of data presents new challenges to efficiently troubleshoot and resolve causes of undesired behavior while at the same time minimizing interruption to network services. Moreover, in the context administration, resolving network issues/events for datacenter networks present daunting challenges because network administrators must quickly identify, prioritize, and address issues based on levels of severity, network impact, and so on. In some situations, a network administrator may be in the middle of resolving one network issue when a new higher priority issue (which requires immediate attention) presents itself. In response, the network administrator typically interrupts his/her current progress/analysis on the first issue to address the new higher priority issue. However, after resolving the new higher priority issue, the network administrator loses his/her progress and must begin anew.

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Overview

According to one or more embodiments of the disclosure, a monitoring device/node (or module) monitors status information for a plurality of nodes in a datacenter network and identifies a first network event for a time period based the status information for at least a portion of the plurality of nodes. The monitoring device provides an interface that includes an initial display page, one or more additional display pages, selectable display objects that correspond to one or more of the plurality of nodes, and a representation of the first network event. In addition, the monitoring device generates a dynamic troubleshooting path for the first network event that tracks a user navigation between display pages, a manipulation setting for one or more of the selectable display objects, and a last-current display page. In this fashion, the dynamic troubleshooting path represents a comprehensive troubleshooting context. Notably, the dynamic troubleshooting path can be saved or "parked" as a card object, which can be subsequently retrieved. The monitoring device also provides an indication of a second network event associated with higher resolution priority relative to the first network event. In response, the monitoring device resets the interface to present the initial display page based on the second network event (e.g., with relevant information/content, etc.). The monitoring device may further retrieve the dynamic troubleshooting path for the first network event (e.g., after resolving the second network event). Retrieving the dynamic troubleshooting path for the first network event causes the monitoring device to present the last-current display page, apply the manipulation setting for the one or more selectable display objects, and load the user navigation between the display pages in a cache so the user can pick-up and continue troubleshooting the first network event without re-tracing any prior steps/analysis.

Description

Various embodiments of the disclosure are discussed in detail below. While specific implementations are discussed, it should be understood that this is done for illustration purposes only. A person skilled in the relevant art will recognize that other components and configurations may be used without departing from the spirit and scope of the disclosure.

A communication network is a distributed collection of nodes interconnected by communication links and segments for transporting data between end nodes, such as servers, routers, virtual machines (VMs), personal computers/workstations, etc. Data centers, as mentioned above, can include a number of communication networks and in this context, distinctions are often made between underlying physical network infrastructures, which form underlay networks, and virtual network infrastructures, which form overlay networks (e.g., software defined networks (SDNs). In operation, overlay networks or virtual networks are created and layered over an underlay network.

Figure 1:
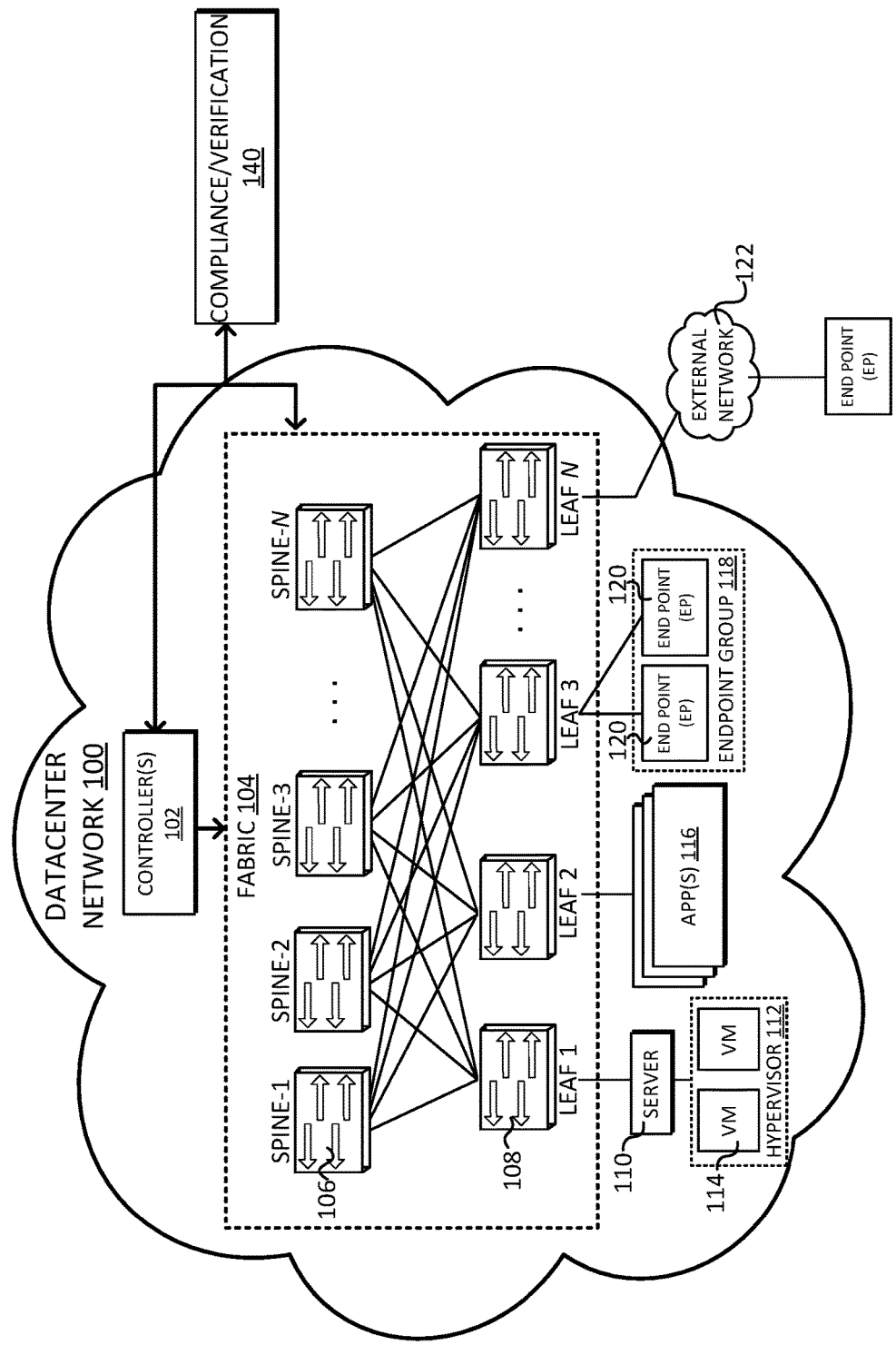
FIG. 1 illustrates a schematic diagram of an example datacenter network.

FIG. 1 illustrates a schematic diagram of an example datacenter network 100. Datacenter network 100 includes one or more controllers 102, which communicate with an underlay network interconnected of physical devices (e.g., switches, routers, etc.) that form fabric 104, which generally switches, routes, forwards, or otherwise facilitate communications (e.g., traffic/data packets, etc.) throughout datacenter network 100.

As mentioned above, some services providers employ software-defined network (SDN) models as well as intent-based frameworks to help automate data center configuration such as resource management, control, and policy enforcement. As used herein, the term "configuration" or "configuration parameters" refers to rules, policies, priorities, protocols, attributes, objects, etc., for routing, forwarding, and/or classifying traffic in datacenter network 100.

In the context of SDN models and intent-based frameworks, network administrators can define configurations for application or software layers and implement such configurations using one or more controllers 102. In some examples, controllers 102 can represent Application Policy Infrastructure Controllers (APICs) for an intent-based Application Centric Infrastructure (ACI) framework, and can operate to provide centralized access to fabric information, application configuration, resource configuration, application-level configuration modeling for a SDN infrastructure, integration with management systems or servers, etc. In this fashion, controllers 102 provide a unified point of automation and management, policy programming, application deployment, health monitoring for datacenter network 100.

In operation, controllers 102 automates processes to render (e.g., translate, map, etc.) a network intent throughout datacenter network 100 and implement policies to enforce the network intent. For example, controllers 102 may receive a business intent at a high level of abstraction, translate it into a network intent using, e.g., distributed knowledge of the network, input from the customer, etc., and define network policy for subsequent implementation/enforcement.

Fabric 104 includes a number of interconnected network devices such as spines 106—e.g., "SPINE(s) 1-N"—and leafs 108—"LEAF(s) 1-N". Spines 106 forward packets based on forwarding tables and, in some instances, spines 106 can host proxy functions (e.g., parsing encapsulated packets, performing endpoint (EP) address identifier matching/mapping, etc.).

Leafs 108 route and/or bridge customer or tenant packets and apply network configurations (which may be provided by controllers 102) to incoming/outgoing traffic. Leafs 108 directly or indirectly connect fabric 104 to other network devices such as servers 110, a hypervisor 112 (including, one or more VMs 114), applications 116, an endpoint group 118 (including, endpoint (EP) devices 120), and an external network 122 (including, additional endpoints/network devices).

Servers 110 can include one or more virtual switches, routers, tunnel endpoints for tunneling packets between a hosted overlay/logical layer and an underlay layer illustrated by fabric 104.

Hypervisor 112 provide a layer of software, firmware, and/or hardware that creates, manages, and/or runs VMs 114. Hypervisor 112 allow VMs 114 to share hardware resources hosted by server 110.

VMs 114 are virtual machines hosted by hypervisors 112, however, it is also appreciated VMs 114 may include a VM manager and/or workloads running on server 110. VMs 114 and/or hypervisor 112 may migrate to other servers (not shown), as is appreciated by those skilled in the art. In such instances, configuration or deployment changes may require modifications to settings, configurations and policies applied to the migrating resources.

Applications 116 can include software applications, services, containers, appliances, functions, service chains, etc. For example, applications 116 can include a firewall, a database, a CDN server, an IDS/IPS, a deep packet inspection service, a message router, a virtual switch, etc. Applications 116 can be distributed, chained, or hosted by multiple endpoints (e.g., servers 110, VMs 114, etc.), or may run or execute entirely from a single endpoint (e.g., EP 120).

Endpoint group 118 organizes endpoints 120 (e.g., physical, logical, and/or virtual devices) based on various attributes. For example, endpoints 120 may be grouped or associated with endpoint group 118 based on VM type, workload type, application type, etc.), requirements (e.g., policy requirements, security requirements, QoS requirements, customer requirements, resource requirements, etc.), resource names (e.g., VM name, application name, etc.), profiles, platform or operating system (OS) characteristics (e.g., OS type or name including guest and/or host OS, etc.), associated networks or tenant spaces, policies, a tag, and so on. In this fashion, endpoint groups 118 are used to classify traffic, define relationships, define roles, apply rules to ingress/egress traffic, apply filters or access control lists (ACLs), define communication paths, enforce requirements, implement security or other configurations associated with endpoints 120.

Endpoints 120 can include physical and/or logical or virtual entities, such as servers, clients, VMs, hypervisors, software containers, applications, resources, network devices, workloads, etc. For example, endpoints 120 can be defined as an object to represents a physical device (e.g., server, client, switch, etc.), an application (e.g., web application, database application, etc.), a logical or virtual resource (e.g., a virtual switch, a virtual service appliance, a virtualized network function (VNF), a VM, a service chain, etc.), a container running a software resource (e.g., an application, an appliance, a VNF, a service chain, etc.), storage, a workload or workload engine, etc. Endpoints 120 have an address (e.g., an identity), a location (e.g., host, network segment, virtual routing and forwarding (VRF) instance, domain, etc.), one or more attributes (e.g., name, type, version, patch level, OS name, OS type, etc.), a tag (e.g., security tag), a profile, etc.

Devices such as controllers 102, fabric 104, and other devices in datacenter network 100 can communicate with a compliance/verification system 140. Compliance/verification system 140 generally monitors, remediates, and provide network assurance for datacenter network 100. Network assurance refers to processes for continuously and comprehensively verifying that network devices are properly configured (e.g., based on network models, etc.), enforcing network security policies, checking for compliance against business rules, remediating issues, providing alerts for network events/status, and the like. Compliance/verification system 140 can also include interfaces for communicating network information to network administrators and for troubleshooting network issues/events. Although compliance/verification system 140 is illustrated as a single system, it can include any number of components, sub-components, and may be implemented in a distributed processing architecture over multiple devices/nodes.

Figure 2:
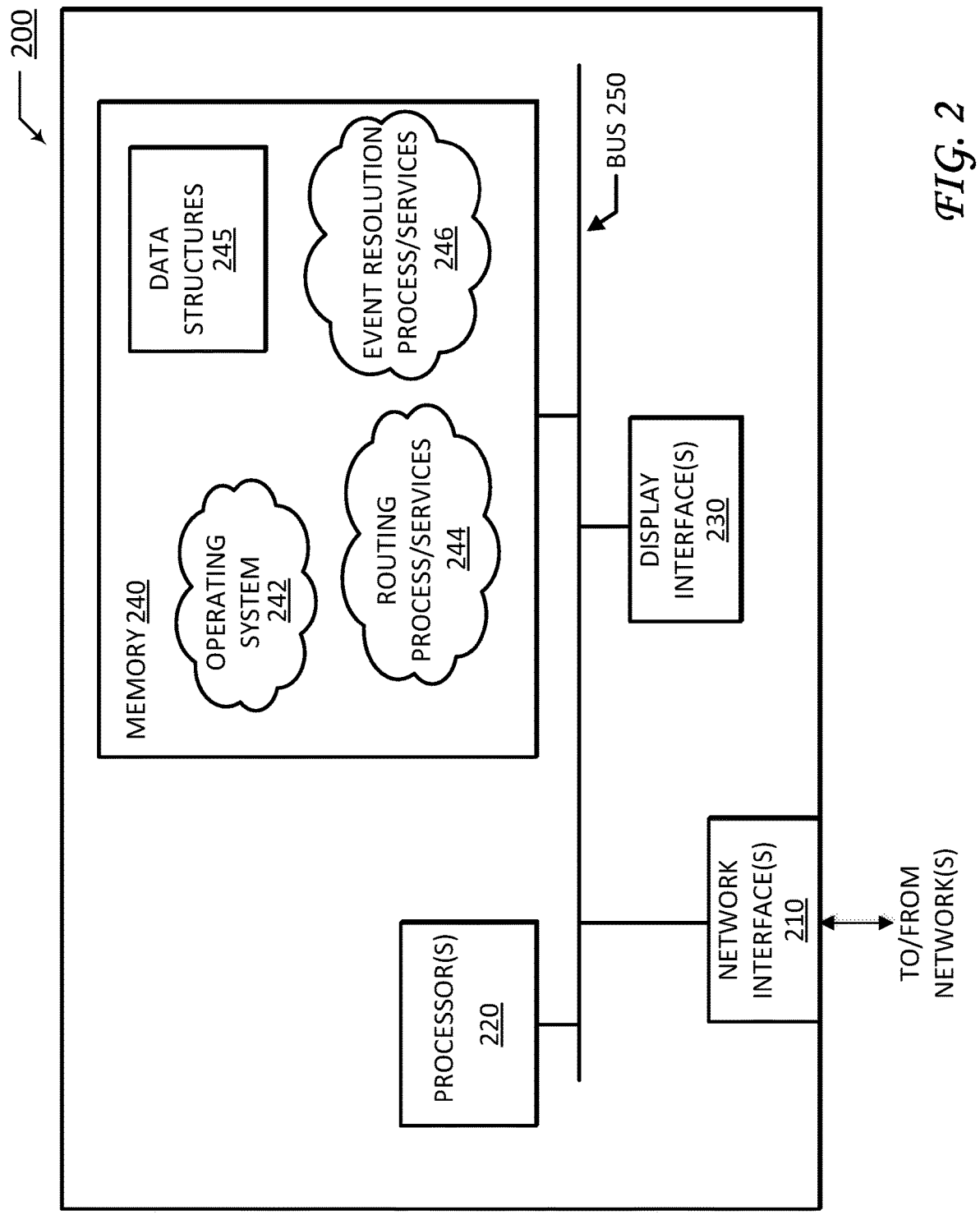
FIG. 2 illustrates a schematic diagram of an example network device/node.

FIG. 2 is a schematic block diagram of device 200, which may be used with one or more embodiments described herein (e.g., as compliance/verification system 140, a component part thereof, and/or as part of a network interface that communicates with compliance/verification system 140). Device 200 may comprise one or more network interfaces 210, at least one processor 220, one or more display interfaces 230, and a memory 240 interconnected by a system bus 250.

Network interface(s) 210 contain the mechanical, electrical, and signaling circuitry for communicating data over links coupled to one or more of the networks shown in communication environment 100. Network interfaces 210 may be configured to transmit and/or receive data using a variety of different communication protocols, as will be understood by those skilled in the art. For example, device 200 may communicate with network devices in datacenter network 100.

Memory 240 comprises a plurality of storage locations that are addressable by processor 220 for storing software programs and data structures associated with the embodiments described herein. Processor 220 may comprise necessary elements or logic adapted to execute the software programs and manipulate data structures 245. An operating system 242, portions of which are typically resident in memory 240 and executed by processor 220, functionally organizes the device by, inter alia, invoking operations in support of software processes and/or services executing on the device. These software processes and/or services may comprise an illustrative routing process/service 244, and an event resolution process 246, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Routing process 244 may also perform functions related to virtual routing protocols, such as maintaining a VRF instance, or tunneling protocols, such as for MPLS, generalized MPLS (GMPLS), etc., as will be understood by those skilled in the art. In one embodiment, routing process 244 may be operable to establish dynamic VPN tunnels, such as by using a DMVPN overlay onto the network.

Routing process/services 244 may further be configured to perform additional functions such as security functions, firewall functions, AVC or similar functions, NBAR or similar functions, PfR or similar functions, combinations thereof, or the like. As would be appreciated, routing process/services 244 may be configured to perform any of its respective functions independently or in conjunction with one or more other devices. In other words, in some cases, device 200 may provide supervisory control over the operations of one or more other devices. In other cases, device 200 may be controlled in part by another device that provides supervisory control over the operations of device 200.

As noted above, administration and resolving network issues present daunting challenges that require network administrators to multi-task and triage issues/events based on severity, impact, etc. Typically, when a network administrator switches from addressing a first issue to address a second issue, current progress, analysis, and troubleshooting steps for addressing the first issue are often lost. In turn, the network administrator often must begin anew when revisiting the first issue.

Event Resolution

As mentioned, the techniques herein may be employed by compliance/verification system 140 (or other systems/interfaces in communication therewith) to address, troubleshoot, and resolve network issues. In some aspects, the techniques are embodied by event resolution process 246 and include operations performed by a monitoring device/node. For example, event resolution process 246 can include processes to monitor status information for a plurality of nodes in a datacenter network, identify a first network event for a time period based on the status information for at least a portion of the plurality of nodes, and provide an interface (e.g., a display interface) for troubleshooting network events. For example, the interface can include a graphical representation of the first network event, an initial display page, and one or more additional display pages of selectable display objects. In this context, the selectable display objects indicate operational parameters of the plurality of nodes for the first network event.

Event resolution process 246 also includes processes to create a dynamic troubleshooting path for the first network event that tracks user navigation (troubleshooting steps) for a last-current display state, changes between display pages, manipulation of selectable display objects (e.g., for respective display pages), and so on. In this fashion, the dynamic troubleshooting path represents a comprehensive troubleshooting context that includes static information presented by the last-current display page/state as well dynamic information regarding prior steps taken (e.g., objects manipulated, pages navigated, etc.) to arrive at the last-current display page. Notably, the dynamic troubleshooting path can be saved or "parked" as a card object associated with the interface. Event resolution process 246 includes processes to provide, by the interface, an indication of a second network event associated with a higher resolution priority as compared to the first network event, update the interface to display the initial display page based on the second network event (e.g., with relevant information/content, etc.), and update the selectable display objects for the one or more additional display pages based on the second network event. Event resolution process 246 includes operations to retrieves the dynamic troubleshooting path (e.g., retrieve saved/parked cards) for the first network event based on user input (e.g., a user resolves the second network event and turns back to the first network event). Once retrieved, the event resolution process 246 resets the selectable display objects for the one or more additional display pages based on the dynamic troubleshooting path, and resets the interface to display the current display state based on the dynamic troubleshooting path.

Illustratively, the techniques described herein may be performed by hardware, software, and/or firmware, such as in accordance with the event resolution process 246, which may include computer executable instructions executed by the processor 220 (or independent processor of interfaces 210) to perform functions relating to the techniques described herein, e.g., in conjunction with routing process 244. For example, the techniques herein may be treated as extensions to conventional protocols and as such, may be processed by similar components understood in the art that execute those protocols, accordingly. Operationally, the techniques herein my generally be implemented by any central or distributed compliance/verification engine located within the computer network (e.g., compliance/verification system 140, distributed among controllers 102, fabric 104, other network devices, etc.).

Figure 3:
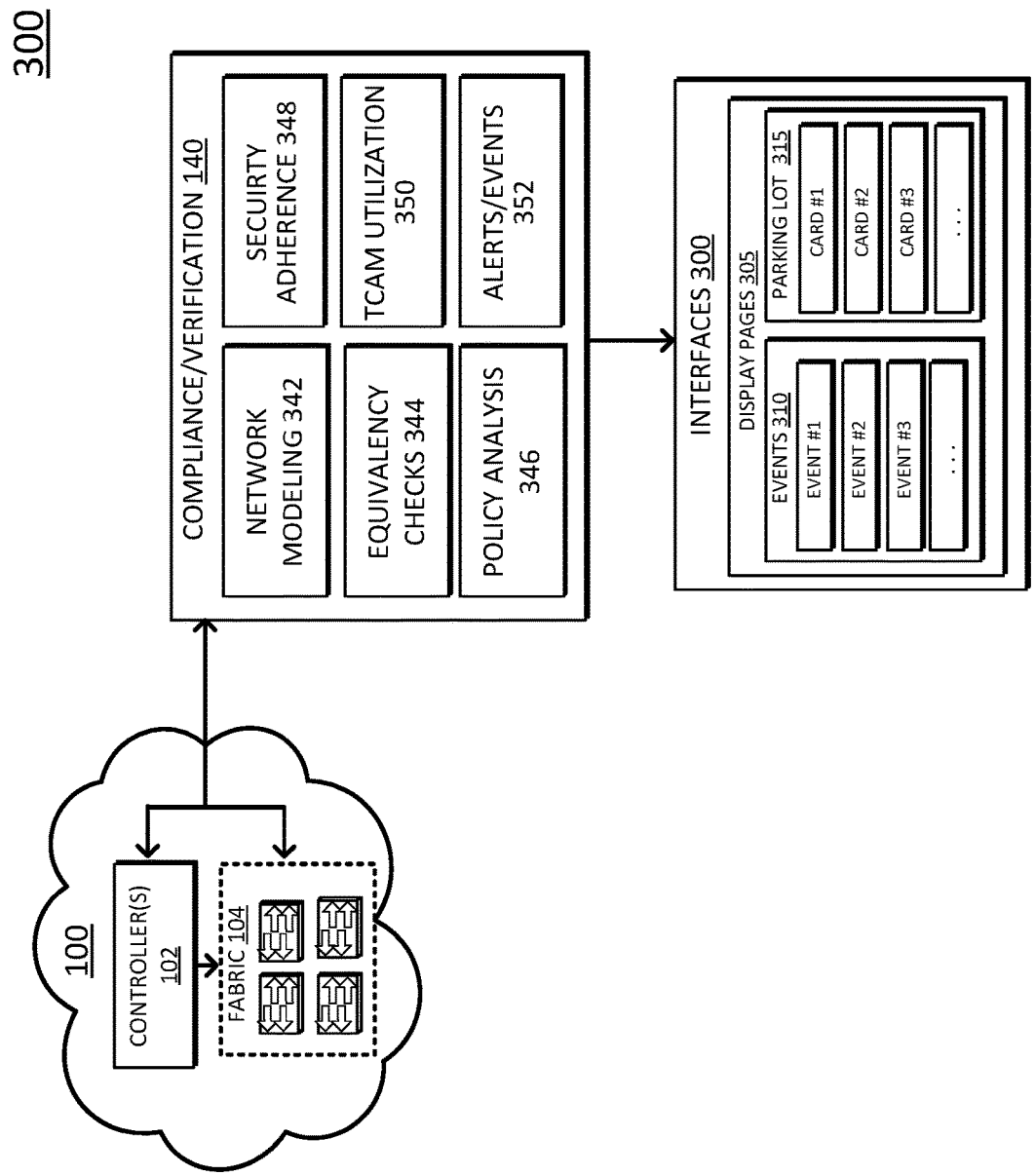
FIG. 3 illustrates a schematic block diagram of a compliance/verification system and associated interfaces.

FIG. 3 illustrates an example schematic block diagram 300 of compliance/verification system 140 and associated interfaces 300, according to one or more embodiments of this disclosure. As shown, compliance/verification system 140 communicates with devices/nodes in datacenter network 100, including for example, controllers 102, fabric 104, etc., as well as with interfaces 300. Notably, although interfaces 300 are represented as a separate component or system from compliance/verification system 140, it is appreciated interfaces 300 may be a component or sub-component of compliance/verification system 140, as discussed above.

As illustrated, compliance/verification system 140 includes components or modules which collectively cooperate to monitor network devices/nodes and generally ensure datacenter operations are in compliance with configurations, policies, etc. For example, compliance/verification system 140 may perform operations similar to an assurance appliance system, described in U.S. patent application Ser. No. 15/790,577, filed on Oct. 23, 2017, the contents of which are incorporated herein by reference to its entirety. As shown, compliance/verification system 140 includes a network modeling component 342, an equivalency checks component 344, a policy analysis component 346, a security adherence module 348, a TCAM utilization module 350, and an alerts/events module 352. In operation, compliance/verification system 140 can identify and verify network topologies (network modeling component 342), perform equivalency checks 344 to ensure logical configurations at controllers 102 are consistent with rules rendered by devices of fabric 104 (e.g., configurations in storage, such as TCAM), perform policy analysis component 346 to check semantic and/or syntactic compliance with intent specifications, enforce security policies/contracts (security adherence module 348), monitor and report ternary content-addressable memory (TCAM) use (TCAM utilization module 350) within the network, and generate alerts or event notifications (alerts/events module 352), and so on.

Compliance/verification system 140 provides the above discussed monitored information as well as event notifications or alerts to interfaces 300. Interfaces 300 represent a set of network administration tools for monitoring network traffic as well as troubleshooting and resolving issues within datacenter network 100. Accordingly, interfaces 300 can include the mechanical, electrical, and signaling hardware/software for exchanging data with compliance/verification system 140 and/or for communicating with one or more nodes in datacenter network 100. In operation, interfaces 300 can classify, organize, and aggregate network status information for corresponding devices/nodes into respective time periods or "epochs" and, for each time period or epoch, interfaces 300 can generate and display summary reports to a network administrator, as discussed in greater detail below.

As shown, interfaces 300 include a number of display pages 305, which organize and present information received from compliance/verification system 140. For example, this information can correspond to certain nodes, networks, sub-networks, and include parameters such as memory utilization, configuration parameters, policy analysis information, contract information, etc.

Interfaces 300 also include display objects such as events 310 and parking lot 315. Events 310 (including the illustrated "event 1", "event 2", event 3", and so on) represent network events or network issues for a given time period or epoch. Events 310 are generated based on, for example, policy conflicts, configuration issues, memory usage, network address conflicts, workload balancing issues, security violations, EPG/SG violations, firewall issues, and so on. With respect to configuration issues, events 310 can include a mismatch between expected configuration parameters at a network controller (e.g., an APIC) and translated configuration parameters at one or more nodes in datacenter network 100 (e.g., leaf nodes 1-N).

Parking lot 315 represents respective troubleshooting placeholders or bookmarks and includes saved "cards" such as the illustrated "card 1", "saved card 2", "saved card 3", and so on. Importantly, these troubleshooting placeholders or bookmarks represent a dynamic troubleshooting path or a comprehensive troubleshooting context, including information presented by a current display page/state as well as steps taken (e.g., objects manipulated, pages navigated, etc.) prior to arriving at the current display page. For example, a network administrator may navigate through a number of display pages, and manipulate a number of selectable objects to identify a source of a network issue. During the troubleshooting process, the network administrator can save or store the dynamic troubleshooting context, which can include the currently displayed page, the path of links to navigate display pages prior to the currently displayed page, as well as the manipulation of selectable objects on respective display pages. Upon retrieval, the dynamic troubleshooting context will re-populate and/or re-execute the prior navigation steps and display the last current display page. In this fashion, the user is presented with the last saved/current display page along with the prior troubleshooting context. The prior troubleshooting context refers to prior display settings for navigation steps leading up to the last saved/current display page.

By way of simple example, assume a user navigates through three display pages, accessed or navigated in the following order: display page 1, display page 2, and display page 3. The user further executes a save/store operation to save the dynamic troubleshooting path while display page 3 is the current page. The save/store operation saves display settings for the current page 3, display settings for prior display pages 1 and 2 (e.g., selectable object manipulations for respective display pages, etc.) and a navigation paths (e.g., links) that represent an order which display pages 1 and 2 were accessed. Upon retrieval of the dynamic troubleshooting path, the user is initially presented with display page 3 since it represents the last current display page. Display page 3 will be presented with the last saved display settings. In addition, from the display page 3, if the user selects an operation to go "back" or display a "previous" page, display page 2 will be shown (since display page 2 was accessed just prior to display page 3). Moreover, any display settings for display page 2 will be applied and displayed such that the user can continue troubleshooting without any lost context. Likewise, prior saved display settings for display page 1 will be applied and displayed.

Figure 4:
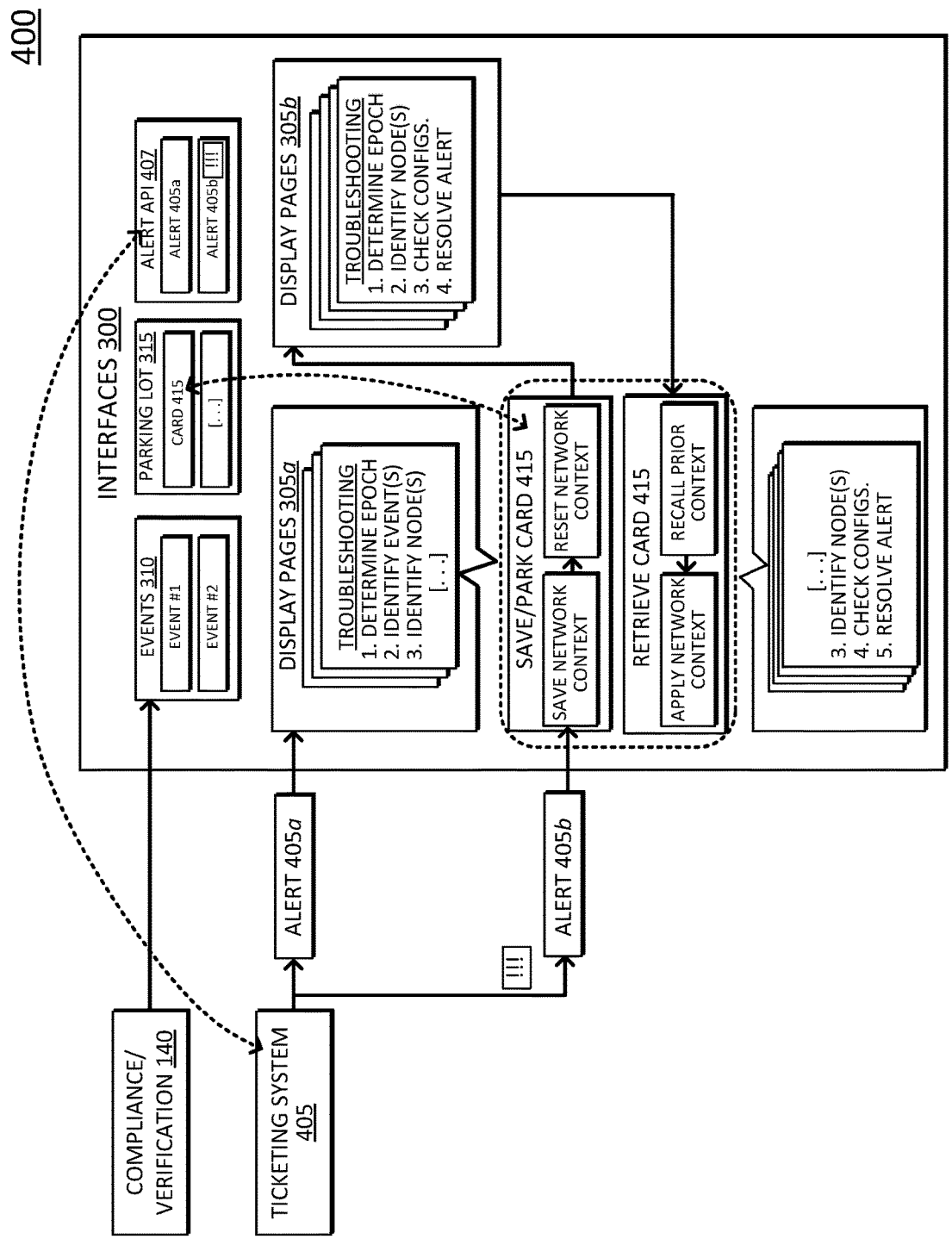
FIG. 4 illustrates a schematic block diagram showing example operations for saving and retrieving a dynamic troubleshooting path, particularly from the perspective of interfaces 300.

The above example may be further appreciated with reference to FIG. 4, which illustrates a schematic block diagram 400 showing operations for saving and retrieving a dynamic troubleshooting path.

As illustrated, troubleshooting operations begin when interfaces 300 receive a ticket or alert—alerts 405a—from a ticketing system 405. Ticketing system 405 can represent an information technology helpdesk system or other type of ticketing systems, as is appreciated by those skilled in the art. For example, ticketing system 405 can operate as a component part of compliance verification system 140, interfaces 300, or as a separate/independent system (as shown). As shown, ticketing system 405 communicates with interfaces 300 (and/or with compliance/verification system 140) using one or more Application Program Interfaces (APIs) 407.

Interfaces 300 receive alert 405a and display a graphical alert indication to notify a user (e.g., a network administrator) about a network issue/condition. In turn, the user reviews alert 405a, and begins a troubleshooting process corresponding to display pages 305a. For example, the user navigates through display pages 305a to determine an appropriate time period/epoch associated with alert 405a (step 1), identifies events associated with the epoch (step 2), and identifies corresponding nodes (step 3). As the user navigates display pages 305a, the user will typically manipulate one or more selectable display objects on respective display pages (e.g., to access additional details/information). As discussed in greater detail below, the selectable display objects can be manipulated to provide more granular details regarding a particular node, sets of nodes, network conditions, configurations, parameters, policies, conflicts, and so on. In addition, during the troubleshooting process, interfaces 300 also create a dynamic troubleshooting path that tracks user navigation between the various display pages, manipulation of selectable display objects on respective display pages, and a current display state (e.g., a current display page).

As illustrated, a second, higher resolution priority alert—alert 405b—interrupts the troubleshooting process corresponding to alert 405a. Again, interfaces 300 may indicate receipt of the second alert by a graphical indication (discussed in greater detail below). Notably, the user can determine alert 405b corresponds to a higher resolution priority by a priority/ranking issued by interfaces 300 (and/or by subjective judgment as appropriate).

Due to its higher resolution priority, the user addresses alert 405b before fully resolving network issues related to alert 405a. However, before switching to troubleshoot/address alert 405b, the user saves the dynamic troubleshooting path for alert 405a, as shown by the save or "park" card operations corresponding to card 415.

As discussed above, saving or parking the dynamic troubleshooting path stores the current network context, which includes information presented by a current display page/state as well as steps taken (e.g., objects manipulated, pages navigated, etc.) prior to arriving at the current display page. In addition, saving the dynamic troubleshooting path can also include operations to reset the network context to an initial state for subsequent troubleshooting (e.g., to begin troubleshooting alert 405b). In particular, resetting the network context can include exiting the current display page, returning the user to an initial display page such as a homepage or a dashboard display page, resetting manipulation of selectable object on corresponding display pages, clearing local navigation caches, and so on.

As illustrated, the save or park operations store the dynamic troubleshooting path, represented by a card 415, which is "parked" in parking lot 315. Once stored, the user addresses alert 405b by navigating through display pages 305b. Notably, display pages 305b can include all or a portion of the same pages as display pages 305a, depending on the nature of alert 405b and information required to resolve the issues. Once resolved, the user retrieves card 415, which corresponds to the stored dynamic troubleshooting path for alert 405a. Retrieving the stored dynamic troubleshooting path for alert 405a can include operations to recall and apply the prior network context. As discussed above, the retrieval operations reload the prior network context and can include presenting the last-current display page, operations to re-load the navigation path or links for prior display pages (e.g., display pages 305a) in a local cache, as well as re-applying the manipulation (e.g., object conditions) to selectable objects on respective display pages, and so on. In this fashion, the user can continue troubleshooting alert 405a without retracing prior navigation steps. As shown here, the user continues to troubleshooting step 3, identifying corresponding nodes, step 4, checking configuration parameters, and step 5, resolving alert 405a.

Notably, although the above discussion of FIG. 4 describes a situation where the user interrupts current troubleshooting steps for resolving a first alert (alert 405a) to resolve a second alert (alert 405b), it is appreciated that the user need not completely resolve such second alert(s). Instead, it is appreciated that the user may save the dynamic troubleshooting path for any alert at any step of the troubleshooting process. Accordingly, parking lot 315 can include any number of parked/saved cards, each corresponding to different alerts and/or different navigation settings for resolving a particular alert.

Figure 5:
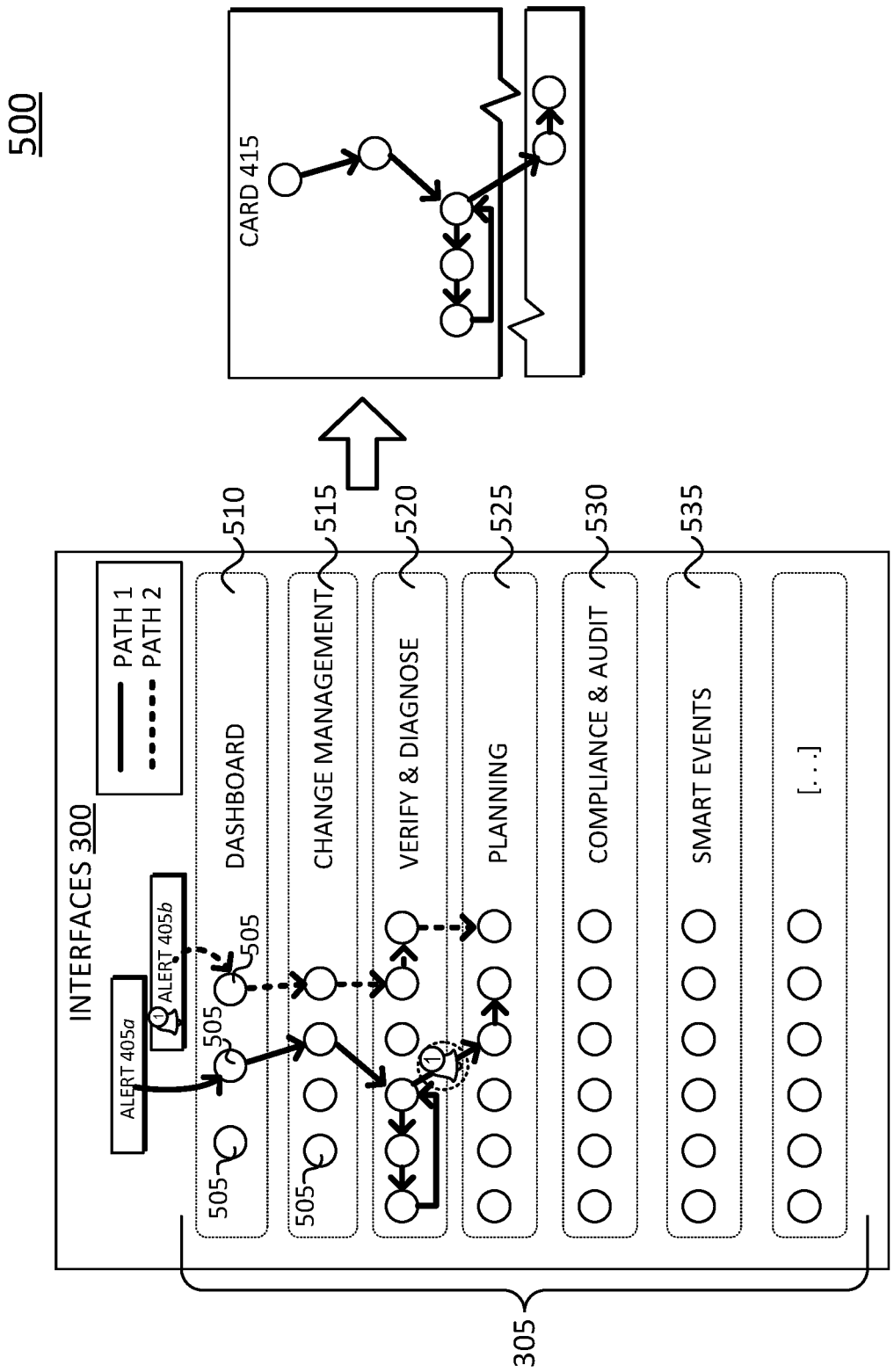
FIG. 5 illustrates a schematic block diagram showing another example representation of the operations to save and retrieve the dynamic troubleshooting path.

FIG. 5 illustrates a schematic block diagram 500 of another example representation of operations for saving and retrieving the dynamic troubleshooting path. As illustrated, display pages 305 include an initial display page, such as a dashboard display page 510, a change management display page 515, a verify & diagnose display page 520, a planning display page 525, a compliance and audit display page 530, a smart events display page 535, and so on. Each of the display pages 305 also includes selectable display objects 505, which are represented by circles. As discussed above, the selectable display objects 505 can be manipulated (e.g., selected) to provide additional details for certain nodes, conditions, settings, policies, and so on, during a troubleshooting process.

The dynamic troubleshooting path(s) are represented, in part, by links between the selectable display objects where a solid line corresponds to the dynamic troubleshooting path for alert 405a and a dash line corresponds to the dynamic troubleshooting path for alert 405b. As discussed above, the user begins addressing alert 405a by navigating through various display pages and manipulating selectable display objects. The user interrupts troubleshooting operations for alert 405a upon receipt of alert 405b. Here, the troubleshooting operations are interrupted while the current display page is verify & diagnose display page 520 (as indicated by a bell with an alert icon). The user saves the dynamic troubleshooting path, as shown by card 415, which stores the comprehensive troubleshooting context. Next, the user addresses alert 405b and retrieves the saved dynamic troubleshooting path (e.g., card 415) in order to continue addressing alert 405a with the saved comprehensive network context restored/re-applied—e.g., with the last-current display page presented, the navigation path or links for prior display pages (e.g., display pages 305a) reloaded in a local cache, and the prior manipulation (e.g., object conditions) applied to selectable objects on respective display pages.

FIGS. 6 and 7A-7D, collectively, illustrate screen shots of display pages presented by interfaces 300 and show various steps in a troubleshooting process, including operations to save/retrieve dynamic troubleshooting paths.

Figure 6:
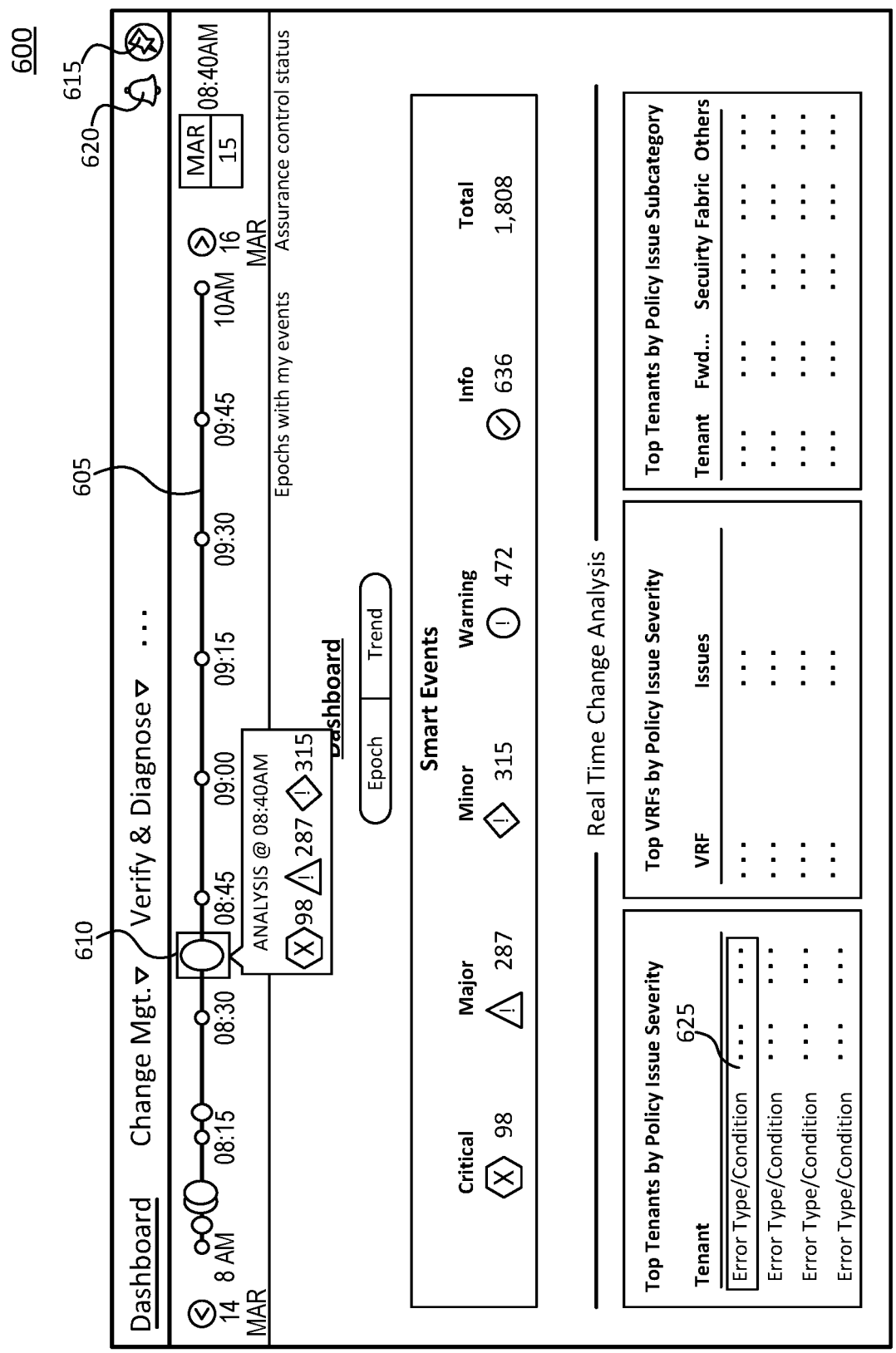
FIG. 6 illustrates a screen shot of an initial display page or a dashboard display page.

For example, FIG. 6 illustrates a screen shot of an initial home page or a dashboard display page 600. Dashboard display page 600 shows a summary view of network events ("smart events") for a particular network report (at a given epoch or time period). Here, the time period corresponds to "8:40 AM on March 15th" and the summary of network events relates to a network report 610.

Notably, the network events are typically organized in network reports based on respective time periods. As shown, the network reports are represented by graphical icons (circles) arranged on a timeline 605. The circles can be assigned a specific color scheme (e.g., red for critical events/issues, yellow for warnings, green for status OK, etc.) and/or a certain size or shape based on a level of severity (e.g., larger radii indicate more serious network events than smaller radii, etc.). Moreover, the size or shape of the graphical icons can also represent a number of critical network events for a given network report (e.g., a larger size corresponds to a larger number or quantity of network events, etc.). In some embodiments, the graphical icon for a network report corresponds to a logarithmic scale associated with the magnitude (e.g., corresponding to a number of pixels to create the graphical icon).

As shown, the graphical icon for network report 610 is selected, which causes the interface to display a summary "analysis" window, which highlights the number of network events based on severity. Notably, the network reports may be automatically generated at periodic epochs and/or the network reports may be generated based specific network events. In this fashion, the network reports and report generation may be customized by a network administrator. As shown, the interfaces generate the network reports based on a hybrid approach—e.g., network reports are automatically generated based on a 15 minute time period and, in addition, network reports are generated based on network events. As mentioned, these network reports are represented by graphical icons arranged on timeline 605.

Dashboard display page 600 also includes a graphical icon—e.g., a pin icon 615—for saving, retrieving, and displaying stored cards corresponding to respective dynamic troubleshooting path. As discussed in greater detail below, a user can select pin icon 615 to view stored cards, save a current network context as a new card, and/or retrieve a stored card to continue troubleshooting a network event/issue. Moreover, dashboard display page 600 also includes a graphical icon—e.g., a bell icon 620—for notifying a user about new tickets, alerts, issues, and so on. In this fashion, bell icon 620 indicates receipt of an alert (or a ticket), which typically corresponds to a degraded performance or network issue for one or more nodes in the datacenter network. Notably, in one or more additional embodiments, the network reports can also be generated based on a time stamp associated with the alert (in addition to the above-discussed automatic/manual report generation). For example, the alert can be time stamped at origination to reflect a time a network issue occurred. In these embodiments, the network reports may be generated based on the time stamp associated with the alert where network events that occur at the same time (or close to the same time) as the time stamp associated with the alert are compiled into a network report.

Dashboard display page 600 further illustrates a summary view of network events and related network information corresponding to network report 610. The summary view includes a "smart events" view, showing the number of network events and an assigned severity level, as well as a "real time change analysis", showing various tenant breakdowns of policy issues. Notably, the graphical icons shown by dashboard display page 600 may include selectable display objects that can be manipulated (e.g., selected, toggled, moved, etc.) to display more granular details regarding a particular node, sets of nodes, network conditions, configurations, parameters, policies, conflicts, and so on. As one example, a selectable object for the "top tenants by policy issue" includes an "error/type condition" object 625. In operation, a user can click on object 625, which causes the interface to display additional information (e.g., a summary window overlay/menu, embedded text below object 625, and/or navigation to a subsequent display page with additional details regarding object 625). In this fashion, object 625 provides a top level view of an error condition, which can be further broken down into more granular details based on user manipulation/selection.

Figure 7A:
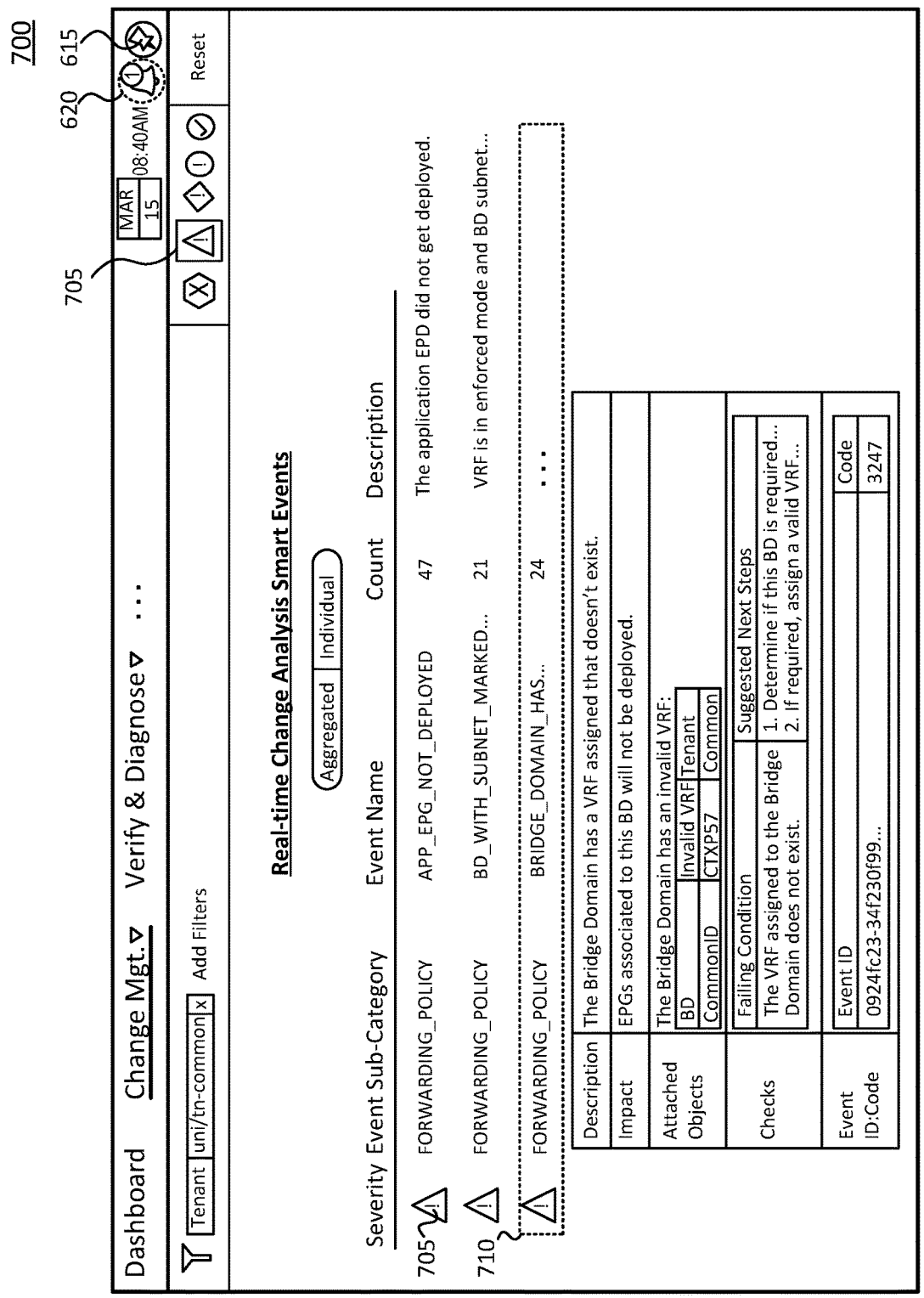
FIGS. 7A-7D illustrate screen shots of additional display pages, showing show various steps in a troubleshooting process, including operations to save/retrieve dynamic troubleshooting paths.
Figure 7B:
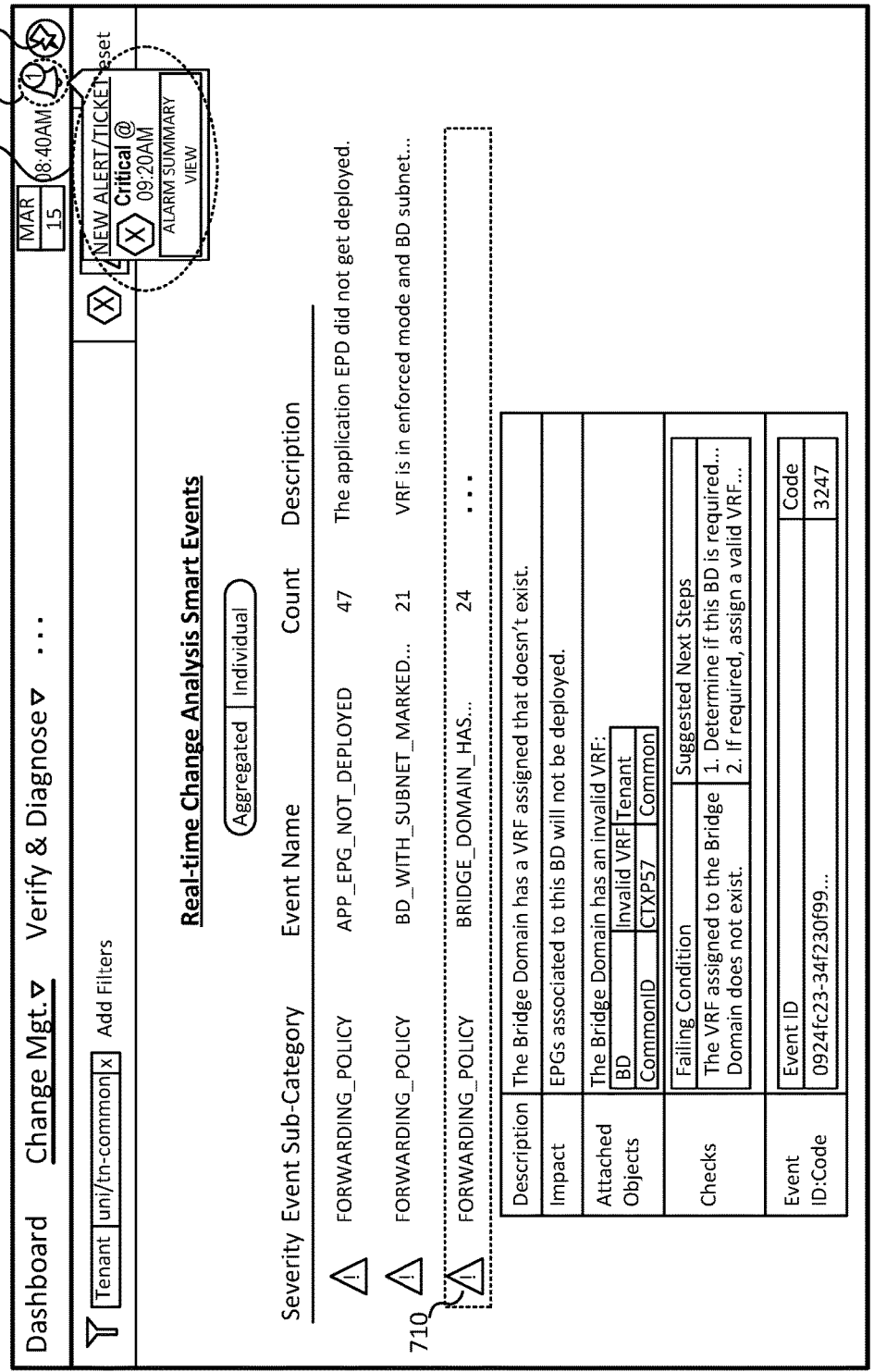
Figure 7C:
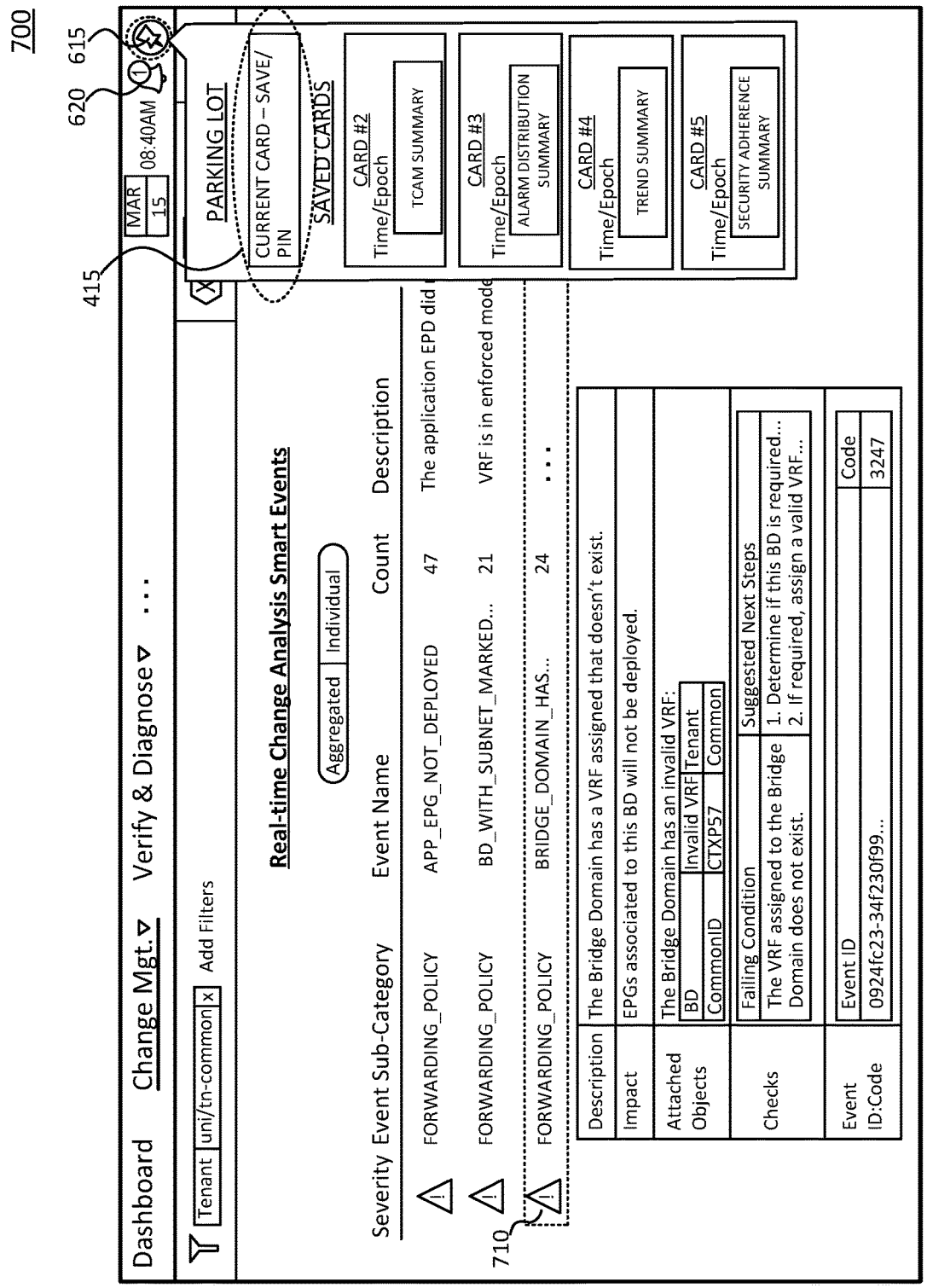

FIGS. 7A-7C illustrate screen shots of a change management display page 700 and specific operations to save/retrieve a dynamic troubleshooting path. As discussed herein, the troubleshooting operations begin with identifying network events related to network report 610 (which corresponds to alert 405a (discussed above)). The user particularly navigates from dashboard display page 600 to change management display page 700 to continue troubleshooting network events associated with network report 610.

As illustrated in FIG. 7A, change management display page 700 shows network events filtered according to a tenant type and a severity level 705 (e.g., major events) and arranged in a table that lists subcategories, event names, counts, and descriptions.

As mentioned above, the various display pages can include selectable objects, which cause the interfaces to display additional information and/or navigate to additional display pages to show the additional information. As shown here, the user manipulates a selectable object 710 corresponding to one of the rows (shown in a dashed line box). This manipulation, in turn, causes the interfaces to display an additional table of information corresponding to the "bridge_domain . . . " network event. In this fashion, the user can drill down into network event details, and determine recommended remedial actions based on details for the failed condition.

For example, manipulating selectable object 710 causes the interfaces to display a description of the network event, its impact on the datacenter network (e.g., datacenter network 100), a list of affected objects, checks (including the failed condition and suggested steps) as well as an event id/code.

As mentioned, a user navigates through the various display pages to troubleshoot network events, which typically correspond to one or more alerts/tickets. Here, the user navigates to change management display page 700 and manipulates selectable object 710 in response to alert 405*a*. However, the troubleshooting process is interrupted by a new higher resolution priority alert, such as alert 405*b*. As mentioned above, the interfaces can generate alert icons, which corresponds to bell icon 620, to indicate receipt of a new alert/ticket. Here, bell icon 620 changes to include a numerical number "1" to indicate receipt of a new alert/ticket. It is appreciated this indication is for purposes of example only and that any number of icons and/or emphasis may be employed to indicate receipt of a new alert/ticket.

Turning now to FIG. 7B, the user notices the indication of a new ticket/alert—alert 405*b*—and selects or manipulates bell icon 620 to cause interfaces to display a severity assigned to alert 405*b* as well as a summary view of related network events for a time period corresponding to alert 405*b*.

As shown, alert 405*b* is assigned a "critical" resolution priority, which is a higher priority than alert 405*a*. As discussed above, due to its higher resolution priority, the user interrupts the current troubleshooting progress for alert 405*a* to address the network events/issues corresponding to alert 405*b*.

Referring to FIG. 7C, the user selects or manipulates pin icon 615 to open a "parking lot" view of saved "cards", where each card corresponds to respective stored dynamic troubleshooting paths. The user further selects the graphical icon corresponding to store the "current card—save/pin" to create stored card 415. As mentioned, the dynamic troubleshooting path represents a comprehensive troubleshooting context, including information presented by the current display page/state, such as change management display page 700, prior objects manipulated such as selectable object 710, filters applied (severity level 705), prior pages navigated (e.g., between the initial display page—dashboard display page 600—and additional display pages), and so on. In operation, the user saves the current dynamic troubleshooting path as stored card 415, and may further select the graphical icons associated with alert 405*b* (ref. FIG. 7B) to begin troubleshooting corresponding network issues.

In particular, after selecting or manipulating the graphical icons associated with alert 405*b*, the interfaces reset the network context to an initial state for subsequent troubleshooting (e.g., to begin troubleshooting alert 405*b*). As mentioned above, the interfaces may exit the current display page, return the user to dashboard display page 600, reset manipulation of selectable object on corresponding display pages, clearing local caches of information regarding navigation for troubleshooting the first network event, and so on. For example, these operations are illustrated by a transition from FIG. 7B (the user selects graphical icons associated with alert 405*b*) to FIG. 7D (the interfaces resets the network context and returns the user to dashboard display page 600).

Figure 7D:
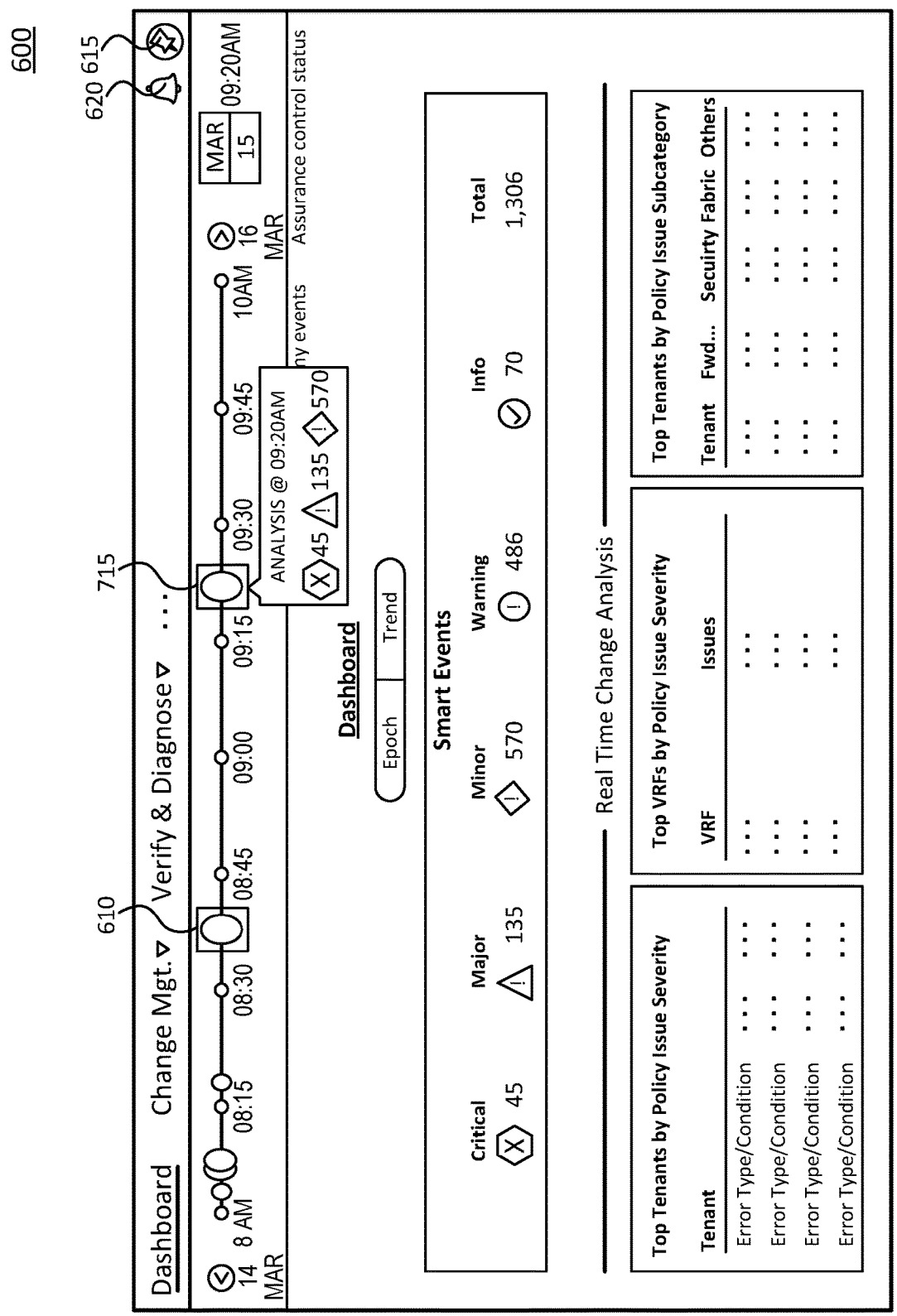

In particular, referring to FIG. 7D, the interfaces present dashboard display page 600 with a new network report at "9:20 AM" (recall, network report 610 includes events corresponding to alert 405*a*). The user can perform troubleshooting operations such as those discussed above to address or otherwise resolve the network events corresponding to alert 405*b*. Notably, the user may save the current dynamic troubleshooting path at any time by manipulating pin icon 615 (e.g., ref. FIG. 7C) and/or retrieve a prior dynamic troubleshooting path (e.g., ref. FIG. 7B) to continue troubleshooting network issues for a prior alert/ticket.

Collectively, FIGS. 7A-7D illustrate operations to save/retrieve a dynamic troubleshooting path. It is appreciated that the graphical icons, display page layouts, and operations to manipulate graphical icons are shown and described for purposes of illustration, not limitation. Any number of additional icons, layouts, manipulation steps may be included (or excluded) as desired.

Figure 8:
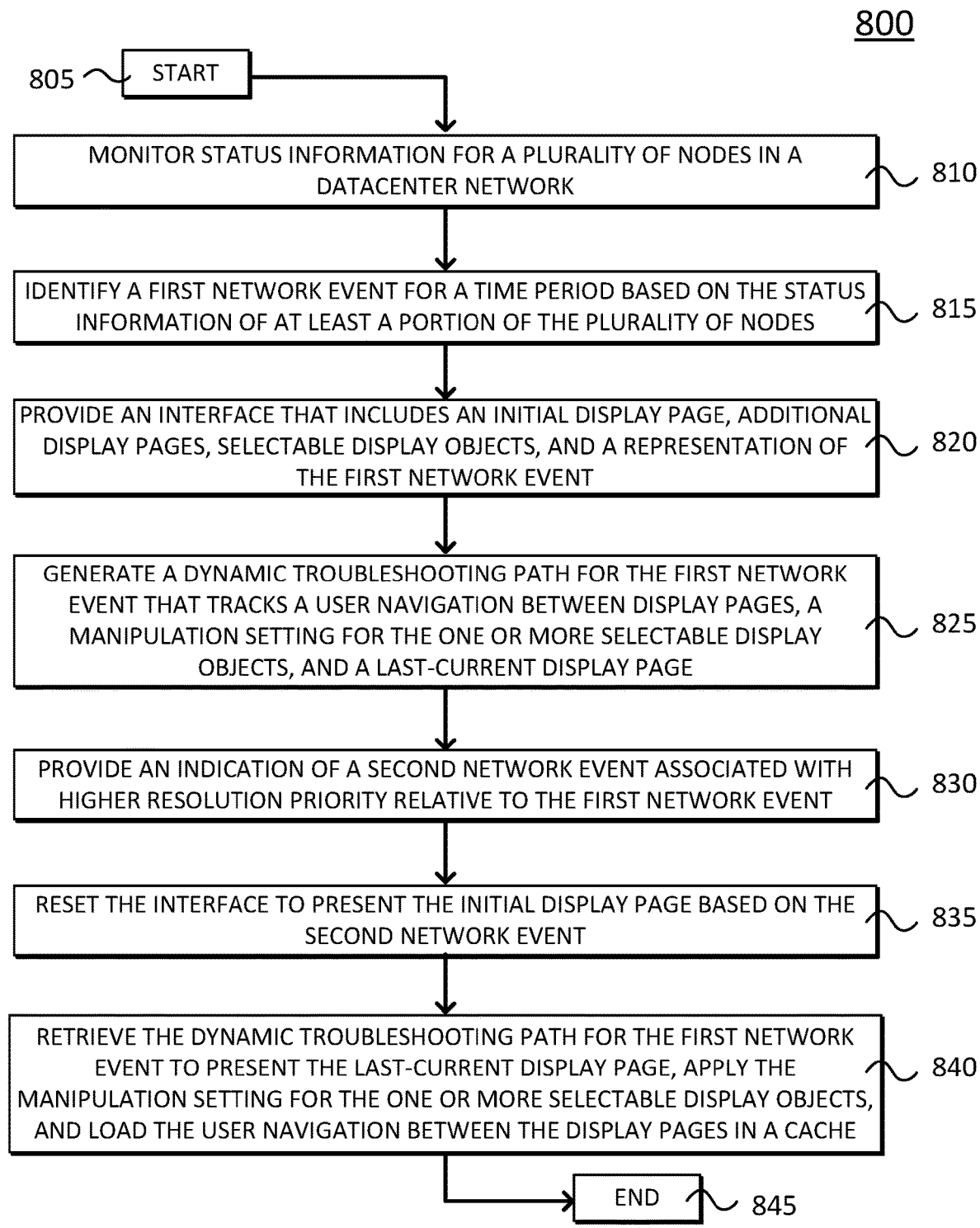
FIG. 8 illustrates an example simplified procedure for troubleshooting network events for a datacenter network.

FIG. 8 illustrates an example simplified procedure 800 for troubleshooting network events, such as in accordance with event resolution process/services 246.

Procedure 800 begins at step 805 and continues to step 810 where a monitoring device monitors status information for a plurality of nodes in a datacenter network (e.g., network 100). The monitoring device can represent compliance/verification system 140, interfaces 300, combinations thereof, and the like. In operation, the monitoring device generally monitors the nodes in datacenter network to provide network assurance regarding performance, security policies, configurations, parameters, conflicts, contracts, service level agreements (SLAs), and so on.

The monitoring device also identifies, at step 815, a first network event for a time period based on the status information of a least a portion of the plurality of nodes. For example, the monitoring device can identify network events based on degraded performance or degraded network assurance parameters (e.g., policy violations, conflicts, etc.). In particular, in one embodiment, the monitoring device can compare expected configuration parameters at a network controller against translated configuration parameters at one or more of the plurality of nodes in the datacenter network. In such embodiment, the monitoring device identifies a network event based on a mismatch between the expected configuration parameters and the translated configuration parameters. These network events may be further compiled into network reports based on respective time periods. Such network events can be presented or displayed by an interface (e.g., interface 300) and arranged on a timeline, as discussed above (e.g., ref. FIG. 6).

The monitoring device also provides an interface, such as interfaces 300, at step 820, which can include an initial display page (e.g., a dashboard display page), additional display pages, selectable display objects, and a representation of the first network event (e.g., alert 405*a*), discussed above. As mentioned above, a user begins troubleshooting the first network issue when a second network event (higher resolution priority issue) occurs. During the troubleshooting operations for the first network event, the monitoring device generates a dynamic troubleshooting path. This dynamic troubleshooting path represents a comprehensive troubleshooting context that tracks a user navigation between display pages, a manipulation setting for the selectable display objects (on respective display pages), and a last-current display page, which represents the last viewed page before saving the dynamic troubleshooting path.

Next, at step 830, the network monitoring device provides an indication of the second network event (e.g., alert 405*b*). As mentioned, the second network event may be assigned a higher resolution priority relative to the first network event, thus requiring immediate attention. In this situation, the user saves the dynamic troubleshooting path as a card object (e.g., card 415) before addressing the second network event.

Saving the dynamic troubleshooting path can further cause the monitoring device to reset, at step 835, the interface to present the initial display page based on the second network event (e.g., present a dashboard display page with a summary view of relevant information for the second network event, etc.). In addition, in some embodiments, resetting the interface can also include resetting manipulation setting for selectable display objects, clearing caches corresponding to the user navigation between display pages for the first network event, and the like.

At some subsequent time (e.g., after resolving the second network event, etc.) the user retrieves the dynamic troubleshooting path for the first network event (e.g., restores card 415), as shown at step 840. Retrieving the dynamic troubleshooting path can modify the interface to present, for example, the last-current display page. In addition, retrieving the dynamic troubleshooting path can also cause the monitoring device to apply the manipulation setting for the one or more selectable display objects, and load the user navigation between the display pages in a cache. In this fashion, the user can pick up and continue troubleshooting without losing any prior analysis and without retracing any prior steps.

Procedure 800 subsequently ends at step 845, but may continue on to step 810 where, as discussed above, the monitoring device monitors status information for the plurality of nodes in the datacenter network. It should be noted that certain steps within procedure 800 may be optional, and further, the steps shown in FIG. 8 are merely examples for illustration—certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, create a dynamic troubleshooting path that tracks both static information (e.g., a last-current displayed page) as well as dynamic information (e.g., manipulation of selectable objects, navigation between display pages, etc.). This dynamic troubleshooting path represents a comprehensive troubleshooting context and allows users to save and retrieve prior analysis for troubleshooting operations. The techniques described herein provide solutions to efficiently address network issues, multi-task between network issues, and restore all saved progress (both dynamic and static information) relating to troubleshooting operations.

While there have been shown and described illustrative embodiments to generate, store, and retrieve the dynamic troubleshooting path, and the like, it is to be understood that various other adaptations and modifications may be made within the spirit and scope of the embodiments herein. For example, the embodiments have been shown and described herein with respect to certain devices, interfaces, and systems, however it is appreciated that such embodiments are provided for purposes of example, not limitation and that the techniques disclosed herein can be incorporated as part of a larger network monitoring infrastructure.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium, devices, and memories (e.g., disks/CDs/RAM/EEPROM/etc.) having program instructions executing on a computer, hardware, firmware, or a combination thereof. Further, methods describing the various functions and techniques described herein can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on. In addition, devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures. Accordingly this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method for troubleshooting network events, the method comprising:

monitoring status information for a plurality of nodes in a datacenter network;

identifying a first network event for a time period based on the status information of at least a portion of the plurality of nodes;

providing an interface that includes an initial display page, one or more additional display pages, one or more selectable display objects associated with the plurality of nodes, and a representation of the first network event;

storing a restorable interface state comprising a dynamic troubleshooting path for the first network event, the dynamic troubleshooting path comprising a last-current display page, a user navigation between display pages prior to the last-current display page and a manipulation setting generated prior to the last-current display page and corresponding to the one or more selectable display objects;

providing, by the interface, an indication of a second network event associated with higher resolution priority relative to the first network event;

resetting the interface to present the initial display page based on the second network event; and restoring the restorable interface state comprising the dynamic troubleshooting path for the first network event to cause the interface to apply the manipulation setting for the one or more selectable display objects, execute the user navigation between the display pages and present the last-current display page.

2. The method of claim 1, wherein resetting the interface to present the initial display page based on the second network event further comprises:
resetting the manipulation setting for the one or more selectable display objects; and
clearing a cache corresponding to the user navigation between display pages for the first network event.

3. The method of claim 1, further comprising:
indicating, by the interface, receipt of an alert corresponding to a degraded performance of one or more of the plurality of nodes, wherein the alert is associated with a time stamp; and
generating a network report that includes at least the first network event for the time period based on the time stamp associated with the alert.

4. The method of claim 1, wherein resetting the interface comprises interrupting a troubleshooting action performed via the interface in association with the first network event, and wherein the dynamic troubleshooting path further comprises a path of links to navigate between the display pages.

5. The method of claim 1, wherein identifying the first network event for the time period further comprises:
monitoring expected configuration parameters at a network controller and translated configuration parameters at one or more of the plurality of nodes in the datacenter network; and
identifying the first network event based on a mismatch between the expected configuration parameters and the translated configuration parameters.

6. The method of claim 1, wherein the first network event is one of a plurality of network events associated with respective time periods, the method further comprising:
compiling one or more of the plurality of network events in a network report based on the respective time periods;
determining a magnitude for the network report based on at least one of a quantity of the portion of the plurality of network events or a severity associated with the portion of the plurality of network events; and
providing a representation of the network report based on the magnitude for the network report.

7. The method of claim 6, wherein at least one of a size, a shape, or a color of the representation of the network report corresponds to the magnitude of the network report.

8. The method of claim 6, wherein a size of the representation of the network report corresponds to a logarithmic scale associated the magnitude.

9. The method of claim 1, further comprising:
receiving an alert corresponding to a network issue, wherein identifying the first network event further comprises identifying the first network event for the time period based on a timestamp associated with the alert.

10. The method of claim 1, further comprising:
identifying a plurality of network events for respective time periods based on the status information for the plurality of nodes in the datacenter network;
compiling the plurality of network events in one or more network reports based on the respective time periods; and
providing, by the interface, a representation of each network report on a timeline, wherein a size of the representation of each network report corresponds to a magnitude of severity.

11. The method of claim 1, wherein the one or more selectable display objects correspond to operational parameters associated with the one or more of the plurality of nodes.

12. A system comprising:
one or more network interfaces to communicate within a datacenter network;
memory; and
one or more processors coupled to the network interfaces and configured to:
identify a first network event for a time period based on status information of at least a portion of a plurality of nodes in the datacenter network;
provide an interface that includes an initial display page, one or more additional display pages, one or more selectable display objects associated with the plurality of nodes, and a representation of the first network event;
store a restorable interface state comprising a dynamic troubleshooting path for the first network event, the dynamic troubleshooting path comprising a last-current display page, a user navigation between display pages prior to the last-current display page and a manipulation setting generated prior to the last-current display page and corresponding to the one or more selectable display objects;
provide an indication of a second network event associated with higher resolution priority relative to the first network event;
reset the interface to present the initial display page based on the second network event; and
restore the restorable interface state comprising the dynamic troubleshooting path for the first network event to apply the manipulation setting for the one or more selectable display objects, execute the user navigation between the display pages and present the last-current display page.

13. The system of claim 12, wherein resetting the interface to present the initial display page based on the second network event comprises:
resetting the manipulation setting for the one or more selectable display objects; and
clearing a cache corresponding to the user navigation between display pages for the first network event.

14. The system of claim 12, wherein identifying the first network event for the time period further comprises:
monitoring expected configuration parameters at a network controller and translated configuration parameters at one or more of the plurality of nodes in the datacenter network; and
identifying the first network event based on a mismatch between the expected configuration parameters and the translated configuration parameters.

15. The system of claim 12, wherein the first network event is one of a plurality of network events associated with respective time periods, wherein the one or more processors are configured to:
compile one or more of the plurality of network events in a network report based on the respective time periods;
determine a magnitude for the network report based on at least one of a quantity of the portion of the plurality of network events or a severity associated with the portion of the plurality of network events; and
provide a representation of the network report based on the magnitude for the network report.

16. The system of claim 15, wherein at least one of a size, a shape, or a color of the representation of the network report corresponds to the magnitude of the network report.

17. The system of claim 12, wherein the one or more processors are configured to:
- identify a plurality of network events for respective time periods based on the status information for the plurality of nodes in the datacenter network;
- compile the plurality of network events in one or more network reports based on the respective time periods; and
- provide a representation of each network report on a timeline, wherein a size of the representation of each network report corresponds to a magnitude of severity.

18. A tangible, non-transitory, computer-readable media having instructions stored thereon, the instructions when executed by one or more processors, cause the one or more processors to:
- identify a first network event for a time period based on status information of at least a portion of a plurality of nodes in a datacenter network;
- provide an interface that includes an initial display page, one or more additional display pages, one or more selectable display objects associated with one or more of the plurality of nodes, and a representation of the first network event;
- store a restorable interface state comprising a dynamic troubleshooting path for the first network event, the dynamic troubleshooting path comprising a last-current display page, a user navigation between display pages prior to the last-current display page and a manipulation setting generated prior to the last-current display page and corresponding to the one or more selectable display objects;
- provide an indication of a second network event associated with higher resolution priority relative to the first network event;
- reset the interface to present the initial display page based on the second network event; and
- retrieve the restorable interface state comprising the dynamic troubleshooting path for the first network event to apply the manipulation setting for the one or more selectable display objects, execute the user navigation between the display pages and present the last-current display page.

19. The tangible, non-transitory, computer-readable media of claim 18, wherein resetting the interface display to present the initial display page based on the second network event further comprises:
- resetting the manipulation setting for the one or more selectable display objects; and
- clear a cache corresponding to the user navigation between display pages for the first network event.

20. The tangible, non-transitory, computer-readable media of claim 18, wherein the instructions, when executed by the one or more further cause the one or more processors to:
- indicate receipt of an alert corresponding to a degraded performance of one or more of the plurality of nodes, wherein the alert is associated with a time stamp; and
- generate a network report that includes at least the first network event for the time period based on the time stamp associated with the alert.

* * * * *